US009100815B2

(12) United States Patent
Shuman et al.

(10) Patent No.: US 9,100,815 B2
(45) Date of Patent: Aug. 4, 2015

(54) PHYSICAL-LAYER SYSTEM PRIORITIZATION AND COMMUNICATION SESSION MANAGEMENT WITHIN A WIRELESS COMMUNICATIONS SYSTEM

(75) Inventors: Mohammed Ataur Shuman, San Diego, CA (US); Amit Goel, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 142 days.

(21) Appl. No.: 12/693,117

(22) Filed: Jan. 25, 2010

(65) Prior Publication Data

US 2011/0185011 A1 Jul. 28, 2011

(51) Int. Cl.
G06F 15/16 (2006.01)
*H04W 8/24* (2009.01)
H04W 60/00 (2009.01)
H04W 88/06 (2009.01)
H04W 48/18 (2009.01)

(52) U.S. Cl.
CPC ............... *H04W 8/24* (2013.01); *H04W 48/18* (2013.01); *H04W 60/00* (2013.01); *H04W 88/06* (2013.01)

(58) Field of Classification Search
CPC ... H04L 67/32; H04L 67/322; H04L 41/0816; H04L 47/14
USPC ........................................ 709/203, 227–228
See application file for complete search history.

(56) References Cited

U.S. PATENT DOCUMENTS

| 5,862,480 | A | 1/1999 | Wild et al. | |
|---|---|---|---|---|
| 7,907,605 | B1* | 3/2011 | Hoot et al. | 370/360 |
| 8,018,923 | B1* | 9/2011 | Lo et al. | 370/360 |
| 8,233,401 | B2* | 7/2012 | Rosenberg et al. | 370/252 |
| 2003/0134637 | A1 | 7/2003 | Cooper | |
| 2004/0151162 | A1* | 8/2004 | Ramaswamy | 370/352 |

(Continued)

FOREIGN PATENT DOCUMENTS

| CN | 1953377 A | 4/2007 |
|---|---|---|
| EP | 1289181 A1 | 3/2003 |

(Continued)

OTHER PUBLICATIONS

International Search Report and Written Opinion—PCT/US2011/021997—ISA/EPO—Oct. 6, 2011.

(Continued)

*Primary Examiner* — Jason Recek
(74) *Attorney, Agent, or Firm* — Raphael Freiwirth

(57) ABSTRACT

Embodiments are directed to selecting a physical layer for an access terminal's (AT's) participation in a communication session. In an embodiment, the AT can register its priorities for multiple physical-layer systems as well as contact information by which an application server can contact the AT over each system. The AT selectively updates the system prioritization and/or contact information. When the AT joins or initiates a communication session, the application server supports the AT on a highest-priority system through which the AT can be contacted. The system supporting the AT's session can change upon request by the AT, the initiative of the application server and/or a detected triggering event. In a further embodiment, multiple systems can be used concurrently to support the AT's session, such that the AT can send and/or receive signaling and/or media for at least a portion of the communication session over the multiple systems concurrently.

64 Claims, 16 Drawing Sheets

(56) References Cited

U.S. PATENT DOCUMENTS

| | | |
|---|---|---|
| 2004/0221053 A1* | 11/2004 | Codella et al. ............... 709/231 |
| 2004/0235463 A1 | 11/2004 | Patel |
| 2005/0037755 A1 | 2/2005 | Hind et al. |
| 2005/0215200 A1 | 9/2005 | Oesterling |
| 2005/0233780 A1 | 10/2005 | Jani et al. |
| 2005/0239498 A1 | 10/2005 | Dorenbosch et al. |
| 2006/0003764 A1 | 1/2006 | Saglam et al. |
| 2006/0172737 A1 | 8/2006 | Hind et al. |
| 2006/0268711 A1 | 11/2006 | Doradla et al. |
| 2006/0287929 A1* | 12/2006 | Bae et al. ..................... 705/26 |
| 2007/0042777 A1 | 2/2007 | Govindarajan et al. |
| 2007/0178933 A1 | 8/2007 | Nelson |
| 2008/0175590 A1* | 7/2008 | Perkins et al. ................. 398/58 |
| 2009/0016310 A1 | 1/2009 | Rasal |
| 2009/0227209 A1 | 9/2009 | Craig et al. |
| 2010/0081436 A1* | 4/2010 | Kubo et al. ................. 455/435.1 |
| 2010/0220188 A1* | 9/2010 | Renkis ........................... 348/143 |
| 2010/0311404 A1* | 12/2010 | Shi et al. ....................... 455/419 |
| 2012/0163177 A1* | 6/2012 | Vaswani et al. ............... 370/236 |

FOREIGN PATENT DOCUMENTS

| | | |
|---|---|---|
| EP | 1617614 A1 | 1/2006 |
| EP | 1956743 A1 | 8/2008 |
| EP | 1962471 A1 | 8/2008 |
| GB | 2380898 A | 4/2003 |
| JP | 2004355242 A | 12/2004 |
| JP | 2010004222 A | 1/2010 |
| WO | WO03051083 A2 | 6/2003 |
| WO | WO2006058553 A1 | 6/2006 |
| WO | WO2006109977 A2 | 10/2006 |
| WO | WO2006111176 A1 | 10/2006 |
| WO | WO2007126814 A2 | 11/2007 |
| WO | WO2008040931 A1 | 4/2008 |

OTHER PUBLICATIONS

European Search Report—EP13168926—Search Authority—The Hague—Nov. 20, 2012.

European Search Report—EP13168938—Search Authority—The Hague—Nov. 25, 2013.

European Search Report—EP13168940—Search Authority—The Hague—Nov. 21, 2013.

* cited by examiner

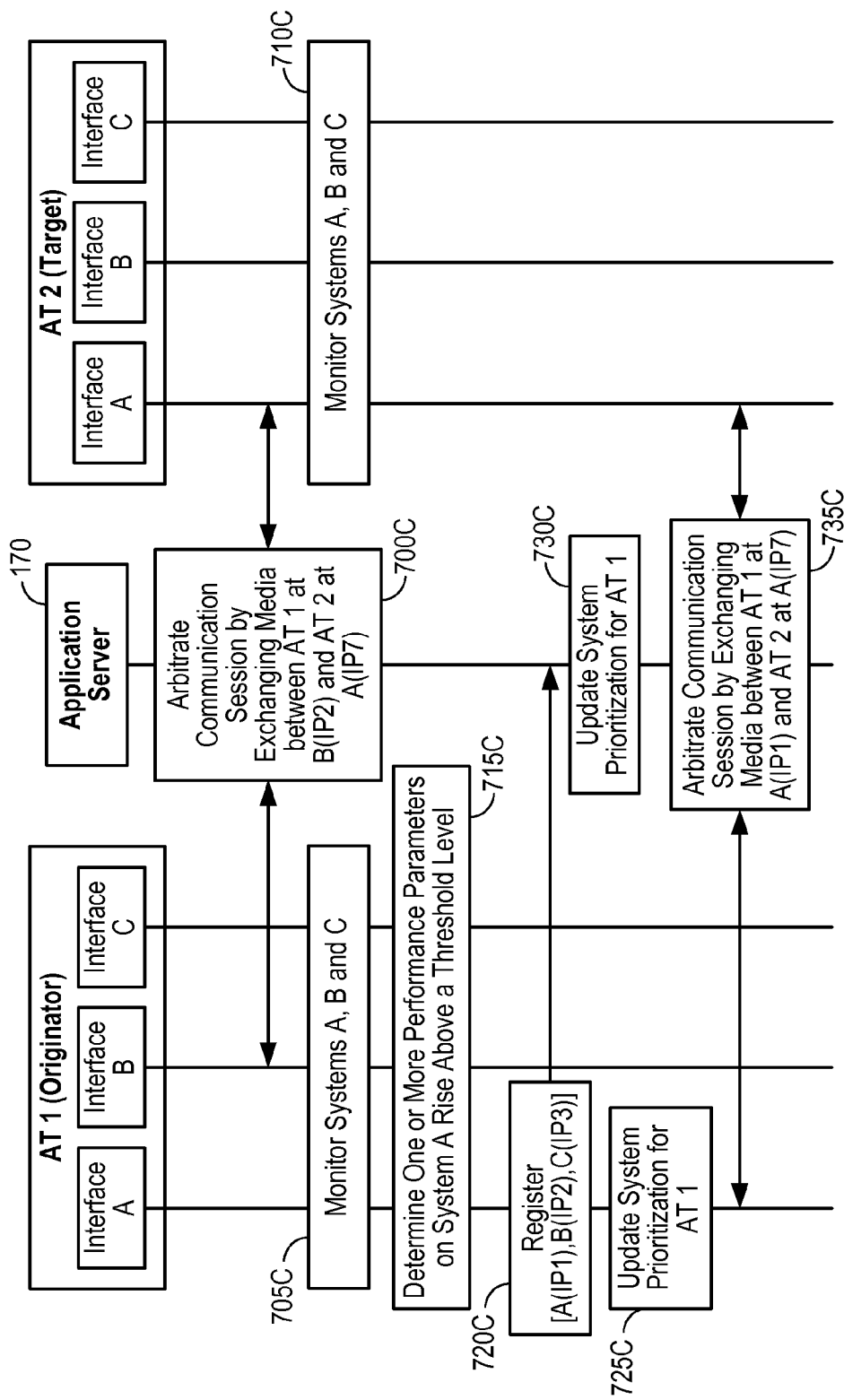

PHYSICAL-LAYER SYSTEM PRIORITIZATION AND COMMUNICATION SESSION MANAGEMENT WITHIN A WIRELESS COMMUNICATIONS SYSTEM

BACKGROUND OF THE INVENTION

1. Field of the Invention

Embodiments of the invention are directed to physical-layer system prioritization and communication session management within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments are directed to selecting a physical layer for an access terminal's (AT's) participation in a communication session within a wireless communications system. In an embodiment, the AT can register its priorities for multiple physical-layer systems as well as contact information by which an application server can contact the AT over each system. The AT selectively updates the system prioritization and/or contact information. When the AT joins or initiates a communication session, the application server supports the AT on a highest-priority system through which the AT can be contacted. The system supporting the AT's session can change upon request by the AT, or based the initiative of the application server. In a further embodiment, multiple systems can be used concurrently to support the AT's session, such that the AT can send and/or receive signaling and/or media for at least a portion of the communication session over the multiple systems concurrently.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 7C illustrates a more detailed implementation of the process of FIG. 7A in accordance with another embodiment of the invention.

DETAILED DESCRIPTION

Figure 1:
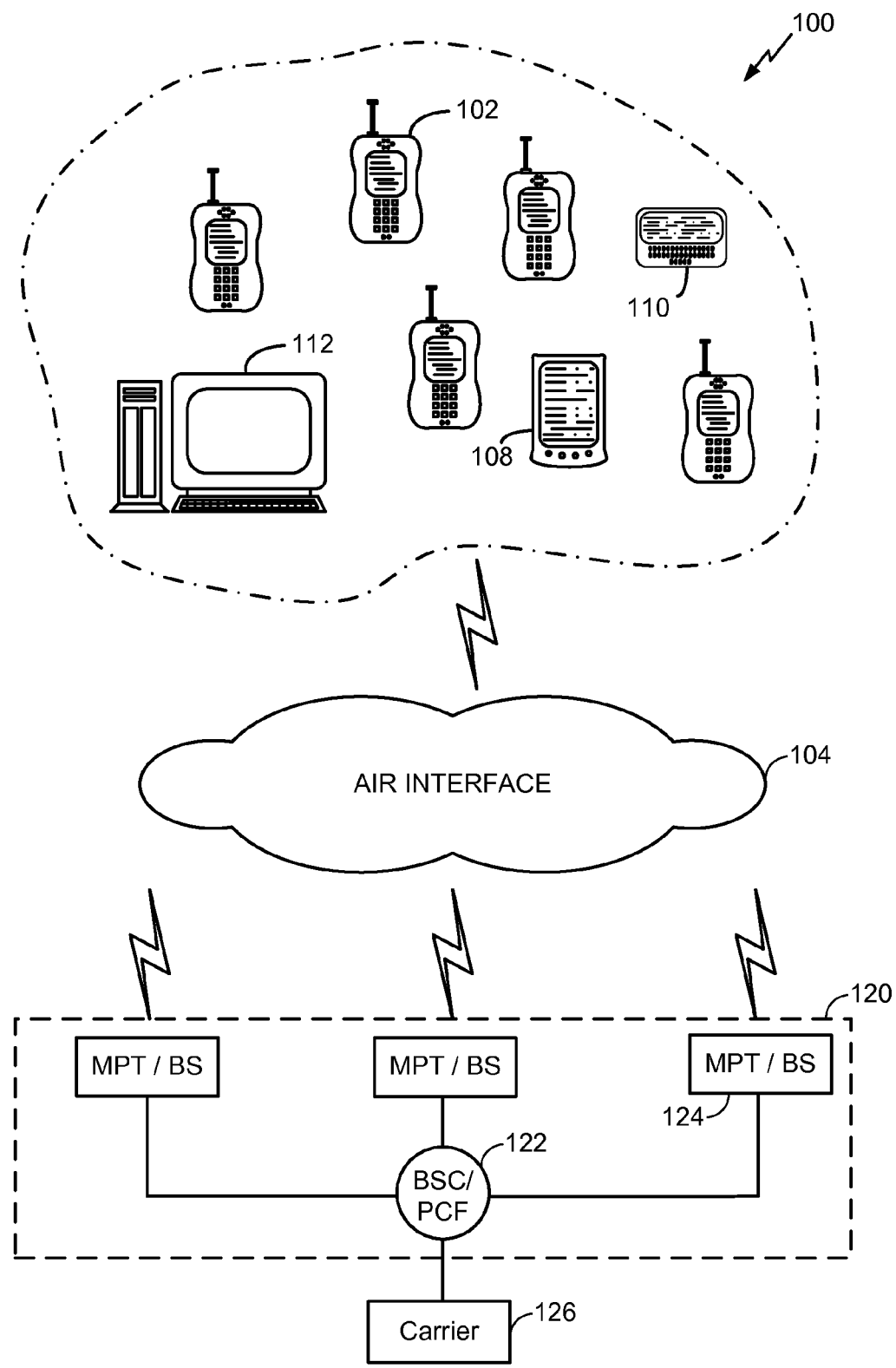
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
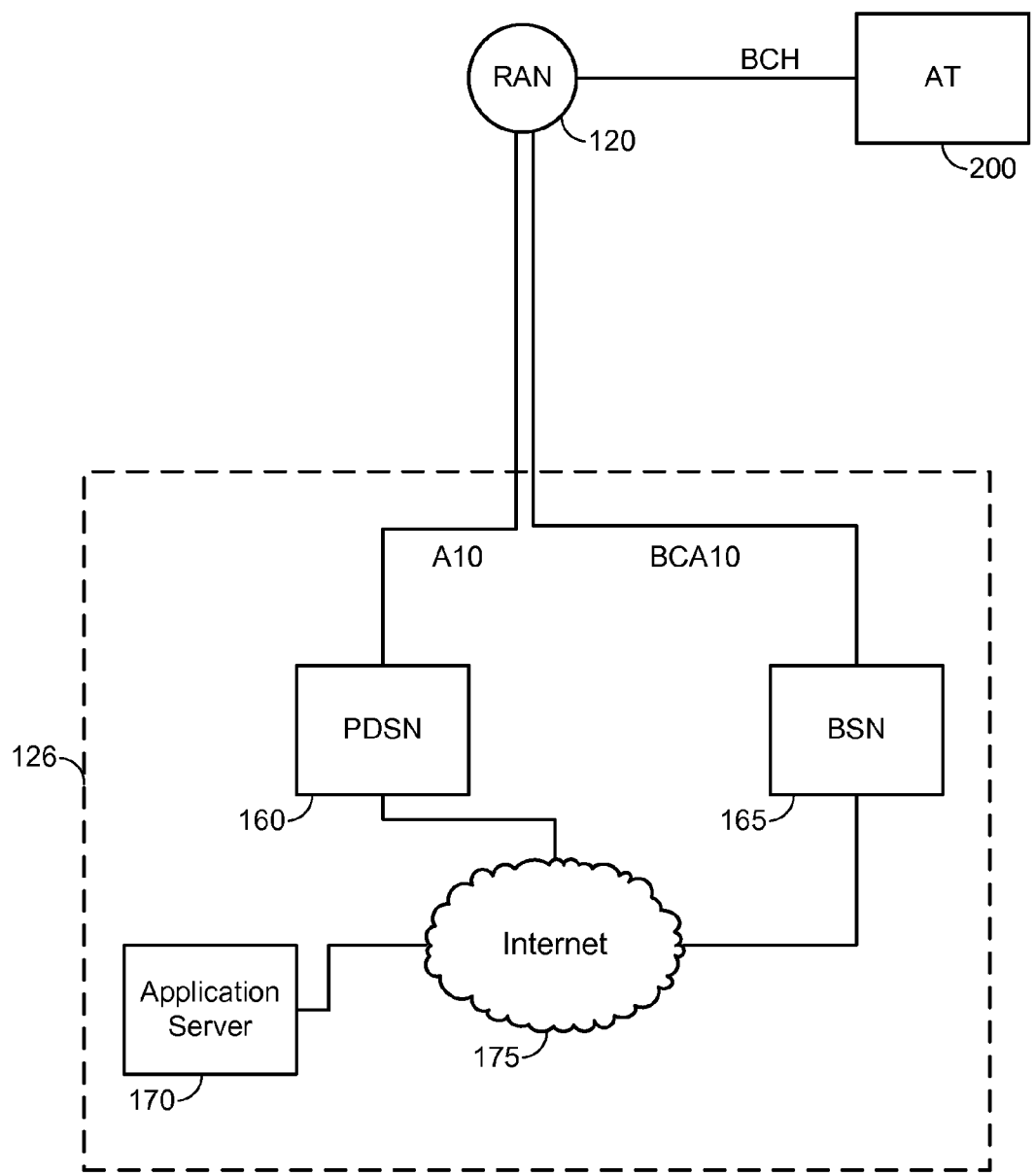
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
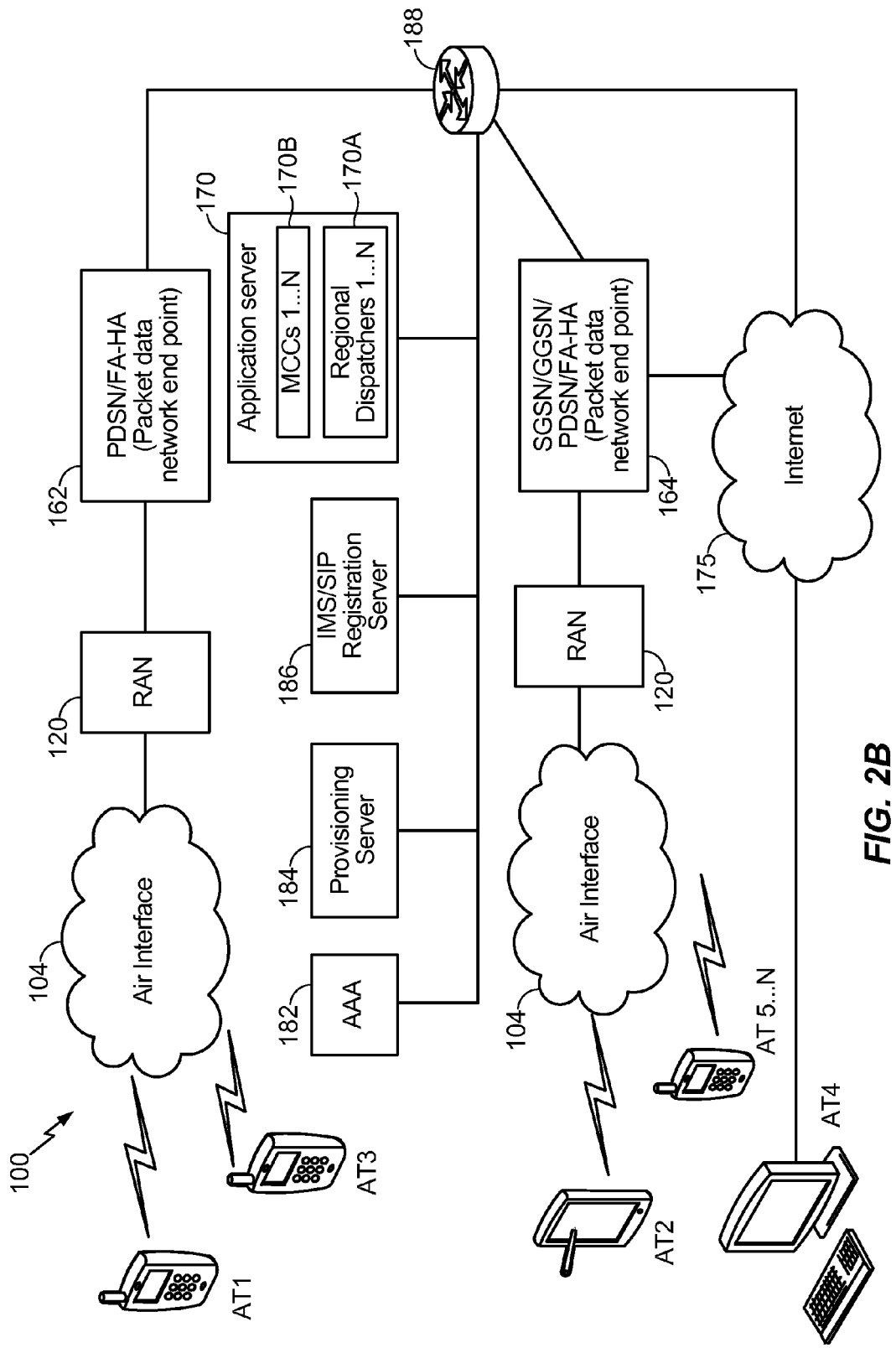
FIG. 2B illustrates an example of the wireless communication of FIG. 1 in more detail in accordance with at least one embodiment of the invention.

FIG. 2B illustrates an example of the wireless communication 100 of FIG. 1 in more detail. In particular, referring to FIG. 2B, ATs 1 . . . N are shown as connecting to the RAN 120 at locations serviced by different packet data network end-points. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 . . . N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between ATs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the ATs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
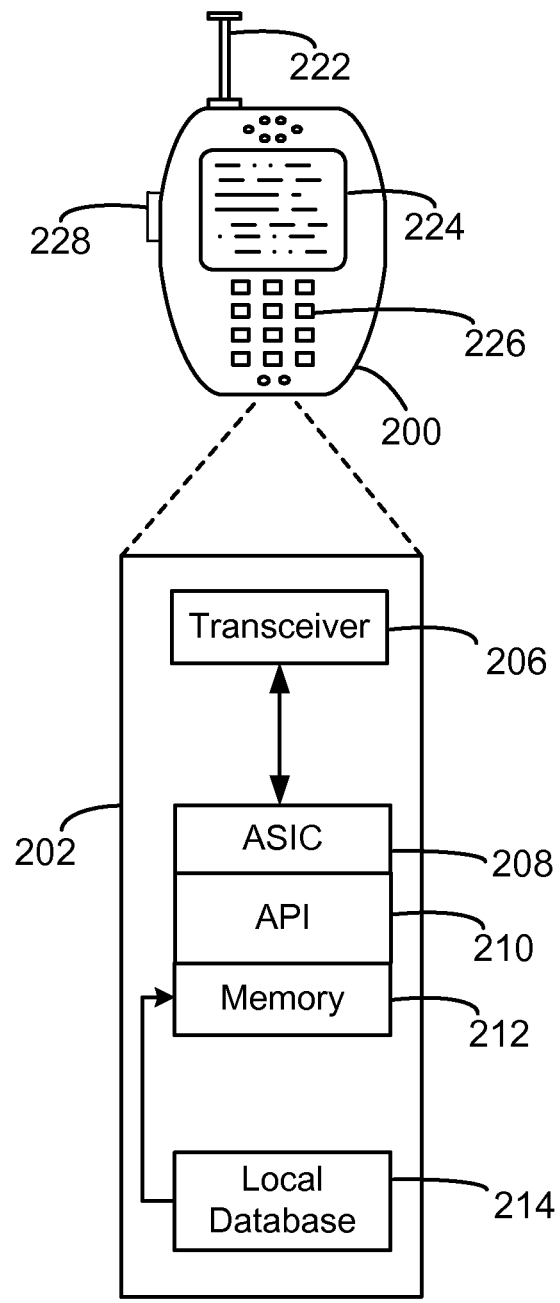
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

As discussed above, access terminals can participate in server-arbitrated communication sessions with other access terminals via a number of potential systems (e.g., EV-DO, 1x, WiFi, LTE, etc.). In other words, different mechanisms or systems can link a given access terminal to the application server 170 over different physical layers for facilitating the exchange of signaling and/or media related to the communication session. For each system, the given access terminal can have an interface with an associated interface address or contact information. As will be appreciated, interfaces to wireless systems include one or more antennas (e.g., such as antenna 222 as illustrated in FIG. 3), whereas interfaces to wired systems can include ports or docks to which wires are connected. For example, the interface of the given access terminal for a WiFi connection may correspond to hardware and/or software modules at the given access terminal configured to receive and/or transmit WiFi information, and the WiFi interface has its own Internet Protocol (IP) address. In the case of WiFi, for example, it will be appreciated that the RAN 120 corresponds to an Access Point (AP) through which the access terminal can connected to the Internet. Thus, incoming packets addressed to the WiFi interface's IP address are handled by the WiFi interface of the given access terminal, incoming packets addressed to the EV-DO's IP address are handled by an EV-DO interface, and so on. Likewise, outgoing packets from the given access terminal sent over the WiFi system include a source address equal to the access terminal's WiFi interface IP address, outgoing packets from the given access terminal sent over the EV-DO system include a source address equal to the access terminal's EV-DO interface IP address, and so on.

Conventionally, most access terminals exchange signaling and/or media with the application server 170 over one particular system at any given time, and the application server 170 is only aware of one system by which to contact each access terminal. Accordingly, if performance on a system used to support a particular access terminal degrades during the communication session, the access terminal is likely to be dropped from the session. The access terminal can, at this point, attempt to set-up its connection to the application server 170 on a different system, but this can take a relatively long time and can lead to a long outage period during which the access terminal cannot participate in the communication session.

Accordingly, embodiments of the invention are directed to registering multiple systems with the application server 170, each system having a system interface associated with a different physical layer, such that the application server 170 can handoff an access terminal to a different system if performance degrades on the access terminal's current system.

Figure 4A:
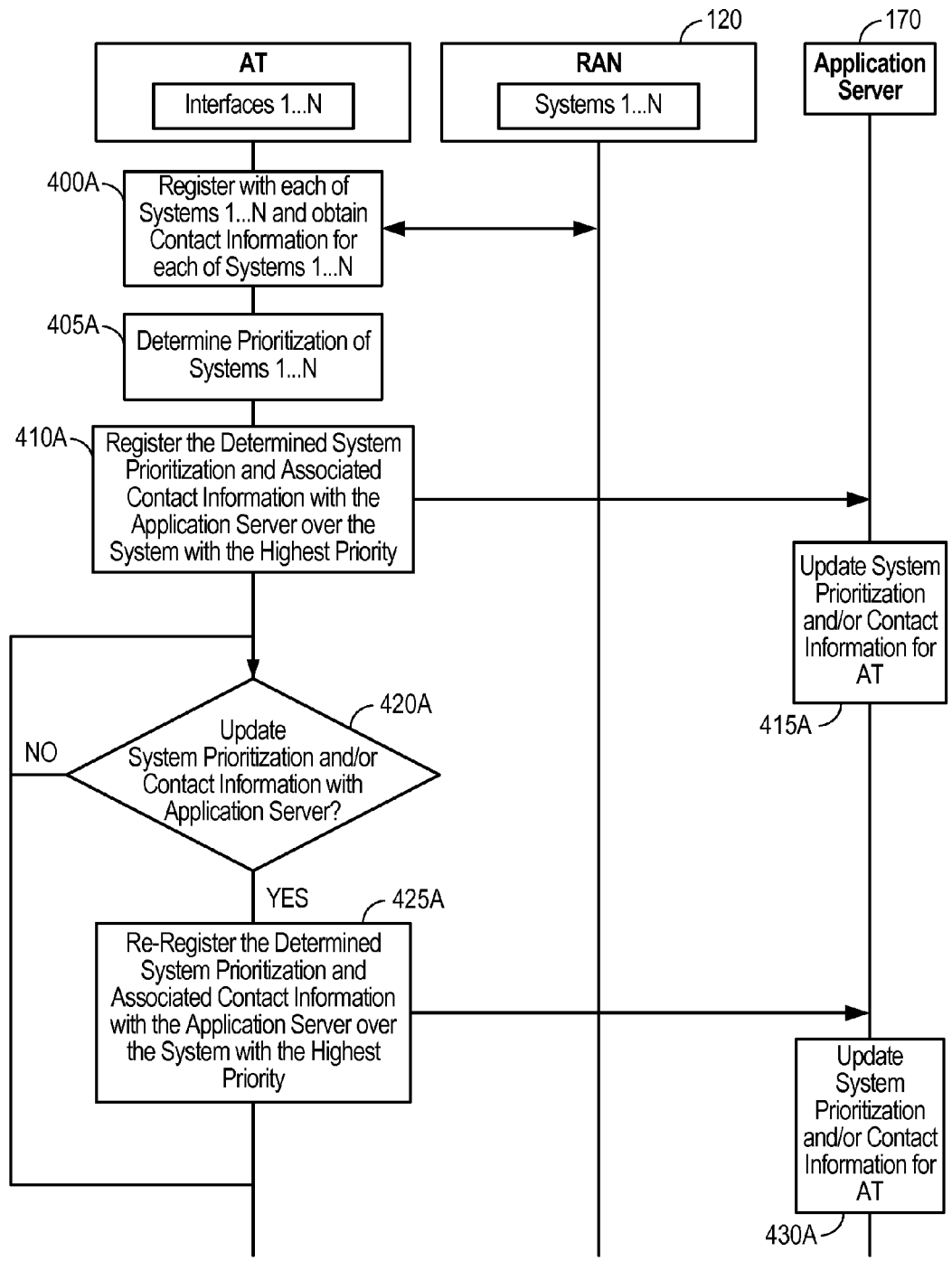
FIG. 4A illustrates a process of registering multiple systems of a given access terminal (AT) with an application server in accordance with an embodiment of the invention.

FIG. 4A illustrates a process of registering multiple systems of a given access terminal (AT) with the application server 170 in accordance with an embodiment of the invention. In particular, FIG. 4A illustrates the registration process at a relatively high-level, with FIG. 4B directed to a more detailed implementation of the registration process.

Referring to FIG. 4A, at some point after the given AT powers up, the given AT registers with systems 1 ... N, where N>=2 and whereby each of systems 1 ... N is associated with a different type of physical layer, 400A. For example, systems 1 ... N can include an EV-DO system, a WiFi system, a 1x system, etc., and/or any other system through which the given AT can contact the application server 170. Further, in addition to obtaining the system registration in 400A, the given AT also obtains contact information (e.g., an IP address, etc.) for system interfaces 1 ... N, each corresponding to one of systems 1 ... N. Thus, system interface 1 corresponds to system 1, system interface 2 corresponds to system 2, and so on. The contact information permits data sent over a given system interface of the given AT to be recognized by the corresponding system at the RAN 120, and permits the corresponding system at the RAN 120 to send data to the appropriate system interface at the given AT.

After registering with each of systems 1 ... N in 400A, the given AT determines a prioritization of systems 1 ... N for its communication sessions that are to be arbitrated by the application server 170, 405A. In an example, the given AT can store the system prioritization determined 405A along with the system interface contact information obtained in 400A in an internal record maintained thereon.

The prioritization of the systems in 405A can be based on a number of different parameters, either alone or in combination. For example, performance parameters such as bandwidth, latency and/or Quality of Service (QoS) can be considered. In another example, the parameters can include cost. In another example, the parameters can include the location and/or environment of the given AT. For example, a WiFi system that offers unlimited data-transfer, high-bandwidth and low-latency may be prioritized over an EV-DO system and/or a 1x system, so long as the connection to the WiFi system is sufficiently strong. In a further example, if the given AT is aware of a defined location region of a particular WiFi system, the prioritization of 405A may prioritize the WiFi system over the EV-DO system and/or 1x system when inside the defined location, and be prioritize the EV-DO system and/or 1x system over the WiFi system when inside of the EV-DO system. Methodologies related to restricting communications in accordance with a defined location region are described in more detail within co-pending U.S. Provisional Patent Application No. 61/163,834, entitled "REGULATING THE SCOPE OF SERVICE GEOGRAPHICALLY IN WIRELESS NETWORKS", filed on Mar. 26, 2009, assigned to the same assignee of the subject application, and hereby incorporated by reference in its entirety.

After prioritizing systems 1 ... N in 405A, the given AT sends a registration message over the system determined to have the highest-priority to the application server 170, 410A. The registration message indicates the determined system prioritization from 405A, and also indicates the associated contact information for each corresponding system interface of the given AT obtained in 400A. The application server 170 receives the registration message and updates a record for the given AT indicative of the given AT's preferred system prioritization and associated system interface contact information, 415A. While not shown in FIG. 4A, in another embodiment, the registration message may include a list of systems and associated system interface contact information without indicating actual system priorities. In this case, the application server 170 itself may rank the listed systems to determine the respective system priorities for the given AT.

Periodically and/or in response to a triggering event, the given AT determines whether to update the system prioritization and/or the associated system interface contact information with the application server 170, 420A. For example, the given AT can determine to update the system prioritization and/or the associated system interface contact information if (i) performance on one or more of the systems improves or degrades, (ii) if a cost on one or more of the systems increases or decreases (e.g., which can be based on a current location of the given AT), (iii) if the contact information for one or more of the system interfaces changes, (iv) if the given AT has been de-registered from one or more of the systems, (v) if the given AT has registered to one or more new systems, (vi) if the given AT has entered or exited a defined location region (vii) and/or any combination thereof.

If the given AT determines not to update the system prioritization or the associated system interface contact information with the application server 170 in 420A, the given AT does not update its registration information with the application server 170. Alternatively, if the given AT determines to update the system prioritization and/or the associated system interface contact information with the application server 170 in 420A, the given AT updates its internal record indicative of the given AT's preferred system prioritization and associated system interface contact information and then sends a supplemental registration message over the system having the highest-priority to the application server 170, 425A, after which the process returns to 420A where the given AT waits for a next update to the system prioritization and/or system interface contact information.

Similar to 410A, the supplemental registration message sent in 425A indicates the updated system prioritization (e.g., although if only the contact information has changed, the system prioritization in the supplemental registration message is un-changed) and updated system interface contact information (e.g., although if only the system prioritization has changed, the contact information in the supplemental registration message is un-changed). The application server 170 receives the supplemental registration message and updates the record for the given AT indicative of the given AT's preferred system prioritization and associated system interface contact information, 430A.

Figure 4B:
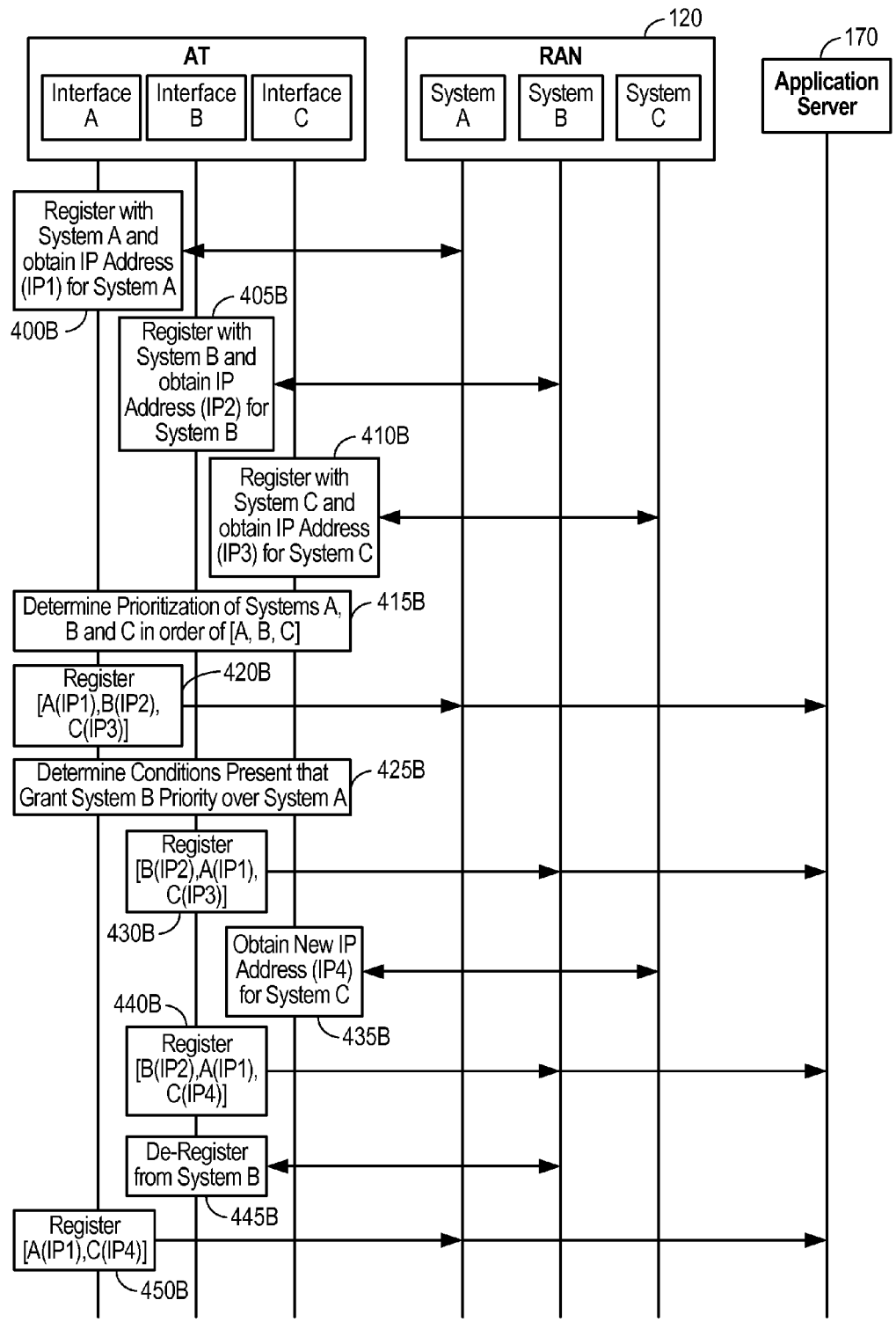
FIG. 4B illustrates a more detailed implementation of the process of FIG. 4A in accordance with an embodiment of the invention.

FIG. 4B illustrates a more detailed implementation example of the process of FIG. 4A in accordance with an embodiment of the invention. Referring to FIG. 4B, at some point after the given AT powers up, the given AT registers with system A and obtains an IP address IP1 that addresses system interface A for the given AT's communications over system A, 400B. The given AT also registers with system B and obtains an IP address IP2 that addresses system interface B for the given AT's communications over system B, 405B. The given AT also registers with system C and obtains an IP address IP3 that addresses system interface C for AT 1's communications over system C, 410B. The system registrations performed in 400B through 410B are each well-known in the art. However, ATs do not typically register with and obtain IP addresses for communications over multiple systems at the same time.

After registering with each of systems A, B and C, the given AT determines a prioritization of systems A, B and C for its communication sessions that are to be arbitrated by the application server 170, 415B. In an example, the given AT can store the system prioritization determined 415B along with the system interface contact information for systems A, B and C in an internal record. The prioritization of 415B is described above with respect to 405A of FIG. 4A, and will not be described again here for the sake of brevity.

In the example of FIG. 4B, assume that the given AT allocates the highest-priority to system A, the next highest-priority (or second highest-priority) to system B and the next highest-priority (e.g., the third highest or lowest-priority in the example with three (3) systems) to system C in 415B. Under this assumption, after prioritizing systems A, B and C, the given AT sends a registration message over system A configured as [A(IP1); B(IP2); C(IP3)] to indicate the system prioritization and associated system interface contact information to the application server 170, 420B.

At some later point in time, assume that the given AT determines that conditions are present that indicate system B should now have a higher priority than system A, 425B. For example, if system B is an EV-DO system, a pilot signal on system B may have a signal strength that has risen above a threshold, etc. Alternatively, conditions on system A may have deteriorated such that system B becomes the best available system based on some performance metric. Accordingly, under this assumption, after updating its internal record indicative of the given AT's system prioritization, the given AT sends a supplemental registration message over system B configured as [B(IP2); A(IP1); C(IP3)] to indicate the updated system prioritization and associated system interface contact information to the application server 170, 430B.

At some later point in time, assume that the given AT determines that the given AT obtains a new IP address IP4 of system interface C for communications over system C, 435B. Accordingly, under this assumption, after updating its internal record indicative of the given AT's system interface contact information, the given AT sends a supplemental registration message over system B configured as [B(IP2); A(IP1); C(IP4)] to indicate the system prioritization and the updated system interface contact information to the application server 170, 440B.

At some later point in time, assume that the given AT de-registers from system B completely, such that the given AT has no IP address for system interface B and cannot communicate over system B, 445B. Accordingly, under this assumption, after updating its internal record indicative of the given AT's system prioritization (i.e., by removing system B entirely), the given AT sends a supplemental registration message over system A configured as [A(IP1); C(IP4)] to indicate the updated system prioritization and associated system interface contact information to the application server 170, 450B.

As will be appreciated, the processes of FIG. 4A and/or FIG. 4B can be performed at any time the given AT is powered-on and is not actively engaged in a communication session with the application server 170. Processes by which a server-arbitrated communication session can be set-up after an execution of the processes of FIGS. 4A and/or 4B will now be described with respect to FIGS. 5A and 5B.

Figure 5A:
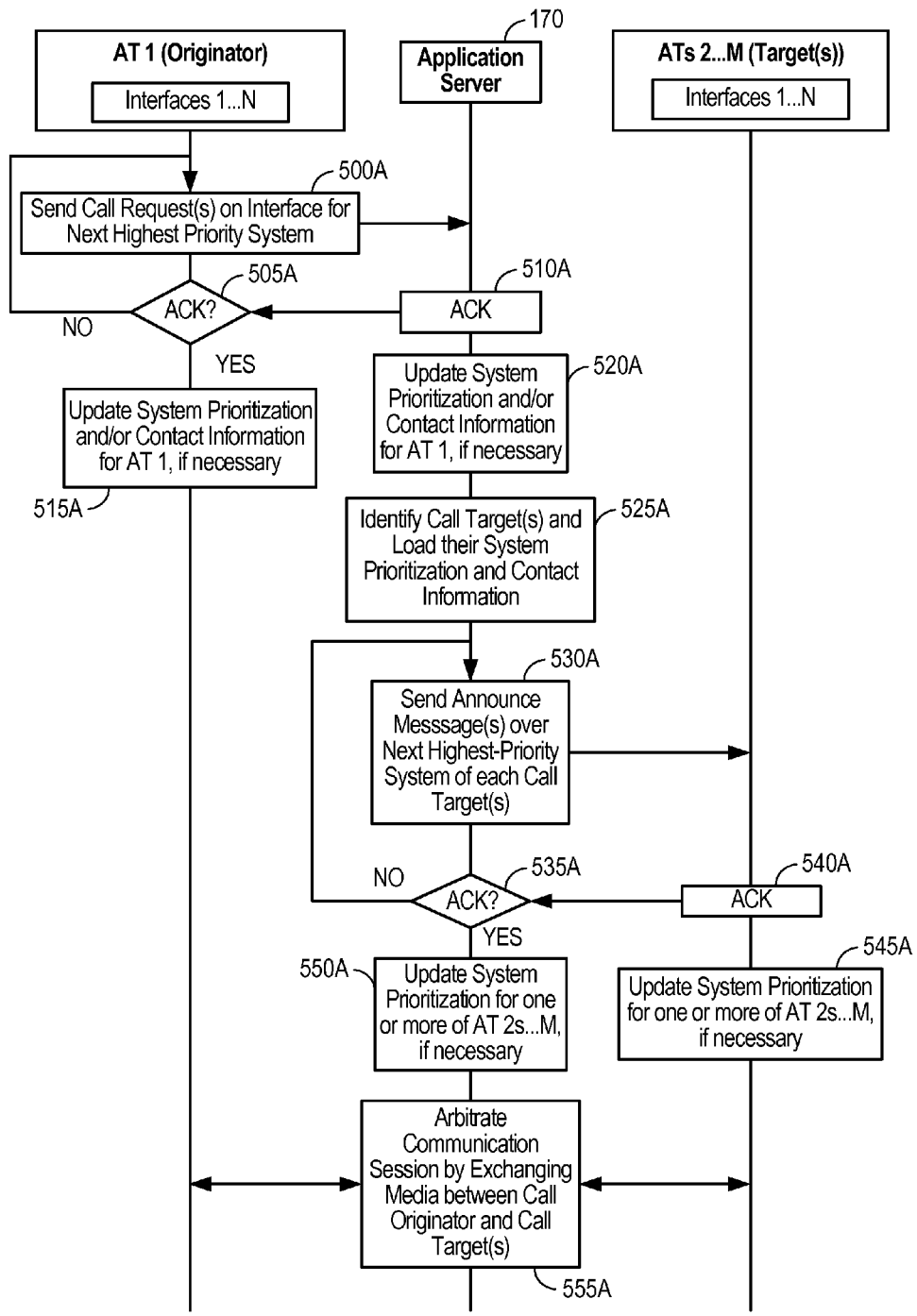
FIG. 5A illustrates a process of setting up a server-arbitrated communication session in accordance with an embodiment of the invention.

FIG. 5A illustrates a process of setting up a server-arbitrated communication session in accordance with an embodiment of the invention. In particular, FIG. 5A illustrates the set-up process at a relatively high-level, with FIG. 5B directed to a more detailed implementation of the registration process.

Referring to FIG. 5A, assume that the process of FIG. 4A at each of ATs 1 ... M has already been executing, such that the application server 170 is aware of the current system prioritizations and system interface contact information for ATs 1 ... M. In 500A, a given AT ("AT 1") among ATs 1 ... M determines to initiate a communication session arbitrated by the application server 170, and thereby sends one or more call request messages over AT 1's highest-priority system to the application server 170 to request a communication session to ATs 2 ... M (e.g., where M>2 for a group session and M=2 for a one-to-one session).

In 505A, AT 1 determines whether the communication session can be supported on the current system. For example, each call request message sent in 500A is associated with a given timeout period, such that if the given timeout period elapses and no ACK to the call request message is received back at AT 1, AT 1 will assume that its call request message has not bent transferred to the application server 170 successfully. After a threshold number (e.g., one, two, etc.) of failed call attempts (i.e., which can be inferred when no ACK to the call request message is received at AT 1), AT 1 will infer that its call cannot be supported by the current system. Otherwise, if an ACK is received as shown at 510A in response to a call request message sent over a given system, AT 1 will assume that its communication session can be supported on that system.

If AT 1 determines that the communication session cannot be supported on the current system in 505A, the process returns to 500A and repeats for the system having the next-highest level of priority. Otherwise, if an ACK to one of the call request messages is received in 510A, AT 1 determines that the communication session can be supported on the current system in 505A, and the process advances to 515A.

In 515A, AT 1 updates the record storing its system prioritization and/or system interface contact information, if necessary. For example, if the iterative process of 500A through 510A resulted in the second highest-priority system being ACKed, then the second highest-priority system can be transitioned to the highest-priority system, with the highest-priority system being demoted to a lower priority in the system prioritization. In another example, if the iterative process of 500A through 510A resulted in the highest-priority system being ACKed, then the record need not be updated. Similarly, in 520A, the application server 170 also updates its record for AT 1's system prioritization, if necessary, based upon which system the application server 170 successfully received the call request message.

The application server 170 evaluates the call request message and identifies the associated call target(s) (i.e., ATs 1 ... M) and loads the system prioritization and system interface contact information for each of the associated call target(s), 525A. Accordingly, in 530A, the application server 170 sends an announce message to each of ATs 2 ... M over the highest-priority systems for each of ATs 2 ... M. In 535A, similar to 505A, the application server 170 determines whether each announce message has been ACKed within a given timeout period. If not, the process returns to 525A and repeats on a next highest-priority system for the non-responsive AT(s). Otherwise, if an ACK is received from ATs 2 ... M as shown in 540A, the process advances to 545A.

In 545A, ATs among ATs 2 ... M that were not reached on their highest-priority system update their system prioritization and the application server 170 likewise updates its system prioritization record for any ATs that were not responsive on their highest-priority in 550A. For example, 545A and 550A may at least replace the old highest-priority system with the system upon which the announce message was ACKed in 540A. After at least one of ATs 2 ... M acknowledge and accept the announced communication session in 540A, the application server 170 begins arbitrating the communication session by exchanging media between the call originator AT 1 and the call targets ATs 2 ... M, 555A. As will be appreciated, the media is exchanged in 555A over the system upon which the call request message was ACKed in 510A for AT 1, and the system upon which the announce message was ACKed in 540A for ATs 2 ... M.

Figure 5B:
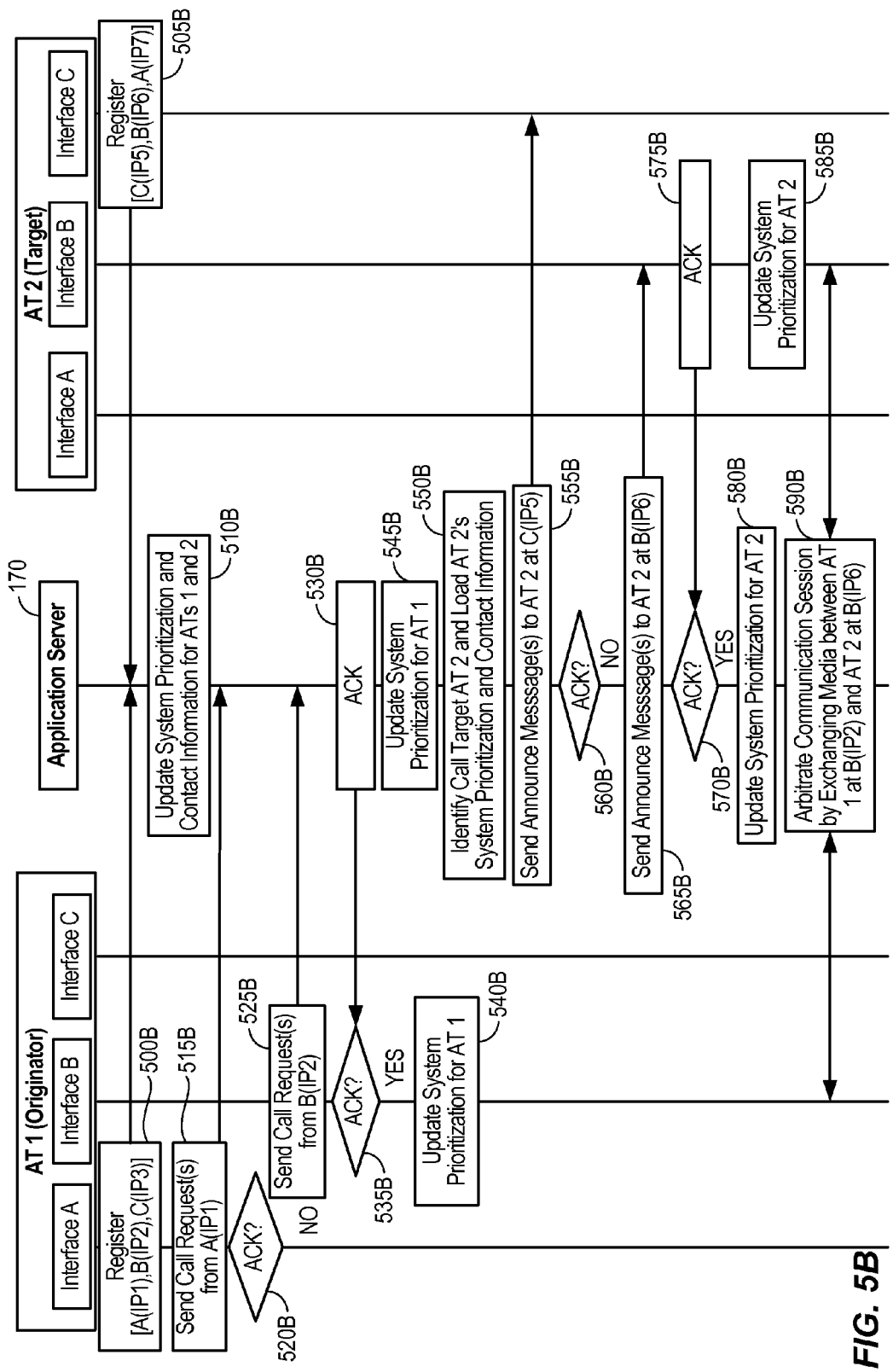
FIG. 5B illustrates a more detailed implementation of the process of FIG. 5A in accordance with an embodiment of the invention.

FIG. 5B illustrates a more detailed implementation example of the process of FIG. 5A in accordance with an embodiment of the invention. Referring to FIG. 5B, assume that AT 1 sends a system priority registration over system interface A configured as [A(IP1); B(IP2); C(IP3)], 500B, and that AT 2 sends a system priority registration over system interface C configured as [C(IP5); B(IP6); A(IP7)], 505B, and that the application server 170 updates its records to reflect the system prioritizations and associated IP addressed reported in 500B and 505B.

At some point in time after the registrations of 500B through 510B, AT 1 attempts to send a call request message over system A to the application server, 515B, but AT 1 determines that no ACK is received to its call request message, 520B. As will be appreciated, AT 1 may attempt one or more re-transmissions on system A, but at some point AT 1 will transition its call request attempts to system B as its second highest-priority system. Accordingly, AT 1 next attempts to send the call request message over system B to the application server, 525B, the application server 170 ACKs the call request message on system B, 530B, and AT 1 determines its call request message on system B is ACKed, 535B. Accordingly, both AT 1 and the application server 170 update their records to at least transition system B to the highest-priority system and demote system A to a lower priority for AT 1, 540B and 545B.

In 550B, the application server 170 identifies AT 2 as a call target and loads the system prioritization and system interface contact information from its records as stored at 510B. The application server 170 sends an announce message over system C at IP address IP5 to AT 2, 555B, and the application server 170 determines that AT 2 does not ACK within the timeout period, 560B. Accordingly, the application server 170 next sends an announce message over system B at IP address IP6 to AT 2, 565B, and the application server 170 determines that AT 2 ACKs within the timeout period, 570B and 575B. Accordingly, both AT 2 and the application server 170 update their records to at least transition system B to the highest-priority system and demote system C to a lower priority for AT 2, 580B and 585B. The application server 170 begins arbitrating the communication session by exchanging media between the call originator AT 1 and the call target AT 2 over system B at IP addresses IP2 and IP6, respectively, 590B.

Figure 6A:
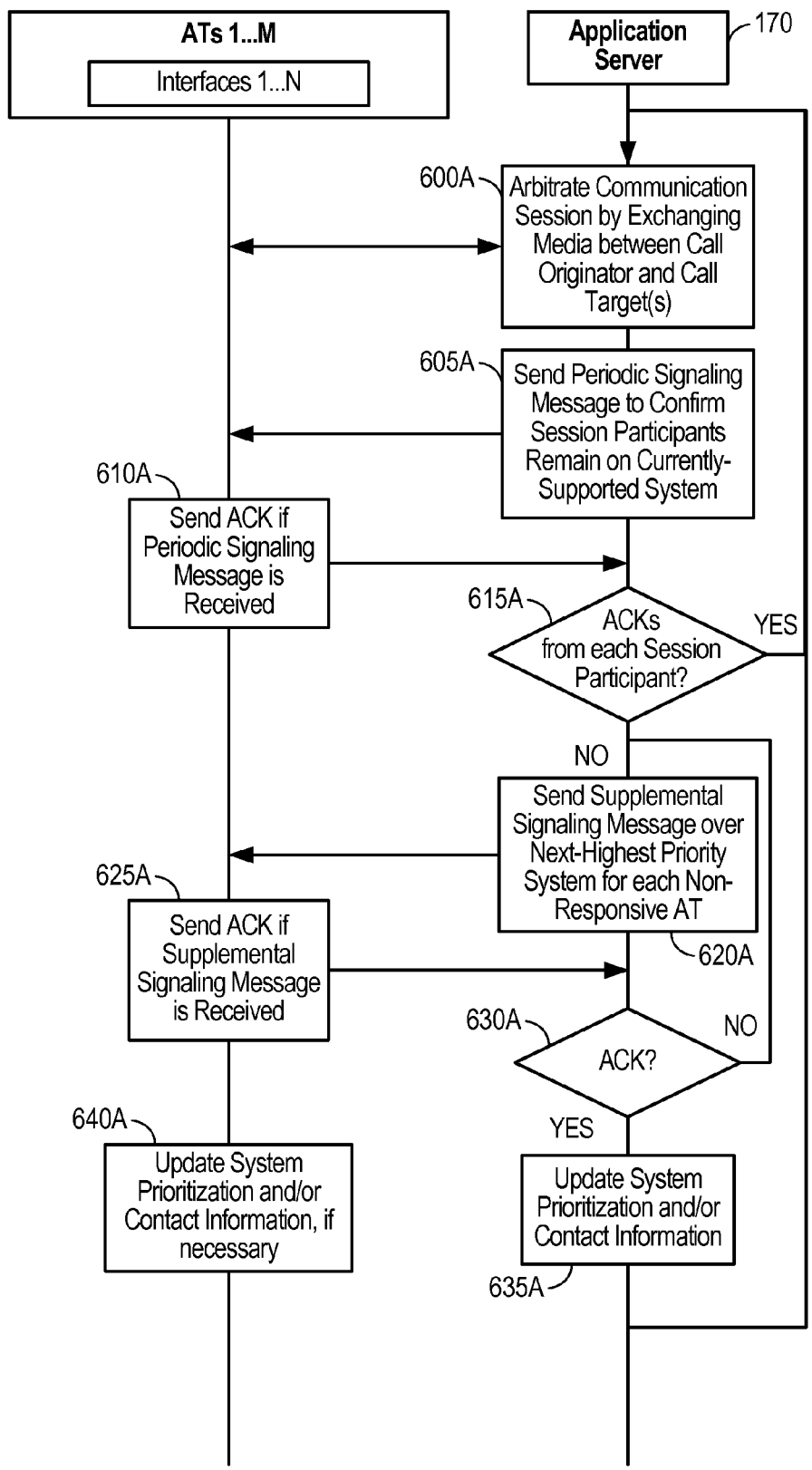
FIG. 6A illustrates a continuation of FIG. 5A in accordance with an embodiment of the invention.

FIG. 6A illustrates a continuation of FIG. 5A in accordance with an embodiment of the invention. Accordingly, in 600A, assume that the application server 170 is arbitrating the communication session by exchanging media between the call originator AT 1 and the call targets ATs 2 ... M. As will be appreciated, 600A of FIG. 6A generally corresponds to 555A of FIG. 5A.

During the communication session, the application server 170 periodically sends a signaling message to each active session participant (i.e., ATs 1 ... M) on their respective highest-priority systems, 605A. In other words, the application server 170 does not typically receive ACKs to the actual media sent to target ATs in 600A, and as such the application server 170 does not know whether one or more ATs have dropped out of the call (e.g., because the system the application server 170 is currently supporting the AT(s) on has degraded, etc.). The periodic signaling message, which is configured to prompt an ACK, thereby functions to inform the application server 170 with regard to whether the current systems carrying the media flow to the active session participants remains a valid manner of contacting the ATs.

Accordingly, each of ATs 1 ... M that receives the periodic signaling message from the application server 170 sends an ACK on their currently-supported system, 610A. In 615A, the application server 170 determines whether each active session participant has ACKed the periodic signaling message. If the application server 170 determines that each active session participant has ACKed the periodic signaling message, the process returns to 600A and the session continues until the next periodic signaling message is sent. Otherwise, if the application server 170 determines that each active session participant has not ACKed the periodic signaling message, the application server 170 sends a supplemental signaling message to each active session participant that did not send an ACK in 610A, 620A. The supplemental signaling message sent in 620A is sent in the next highest-priority level system for each non-responsive AT. Thus, the second highest-level priority system is the next highest-level priority system for the highest-level priority system, the third highest-level priority system is the next highest-level priority system for the second highest-level priority system, and so on. Also, the supplemental signaling message sent in 620A need not be 'periodic' in the sense that the message from 605A is periodic. Rather, the supplemental signaling message sent in 620A can be sent as soon as possible after the application server 170 determines a higher-priority system has not ACKed the previous supplemental or periodic signaling message.

Accordingly, each of ATs 1 ... M that receives the supplemental signaling message from the application server 170 sends an ACK on the system upon which the supplemental signaling message is received, 625A. In 630A, the application server 170 determines whether the non-responsive AT(s) targeted for the supplemental signaling message have ACKed the supplemental signaling message. If the application server 170 determines that each AT to which the supplemental signaling message of 620A is sent has not ACKed the supplemental signaling message in 630A, the process returns to 620A and repeats for each AT that remains non-responsive and another supplemental signaling message is sent on each of the remaining ATs' next highest-priority system(s). Accordingly, 620A through 630A is an iterative process that repeats until an ACK is received or each system for any non-responsive ATs has been pinged.

Otherwise, if the application server 170 determines that each AT to which the supplemental signaling message of 620A is sent has ACKed the supplemental signaling message in 630A, the application server 170 updates its system prioritization for the ATs that did not ACK on their highest-priority system such that the ACKed-system is transitioned to the new highest-priority system, 635A. Likewise, ATs that receive a supplemental signaling message on a system other than their highest-priority system will transition the other system to their new highest-priority system, 640A.

Figure 6B:
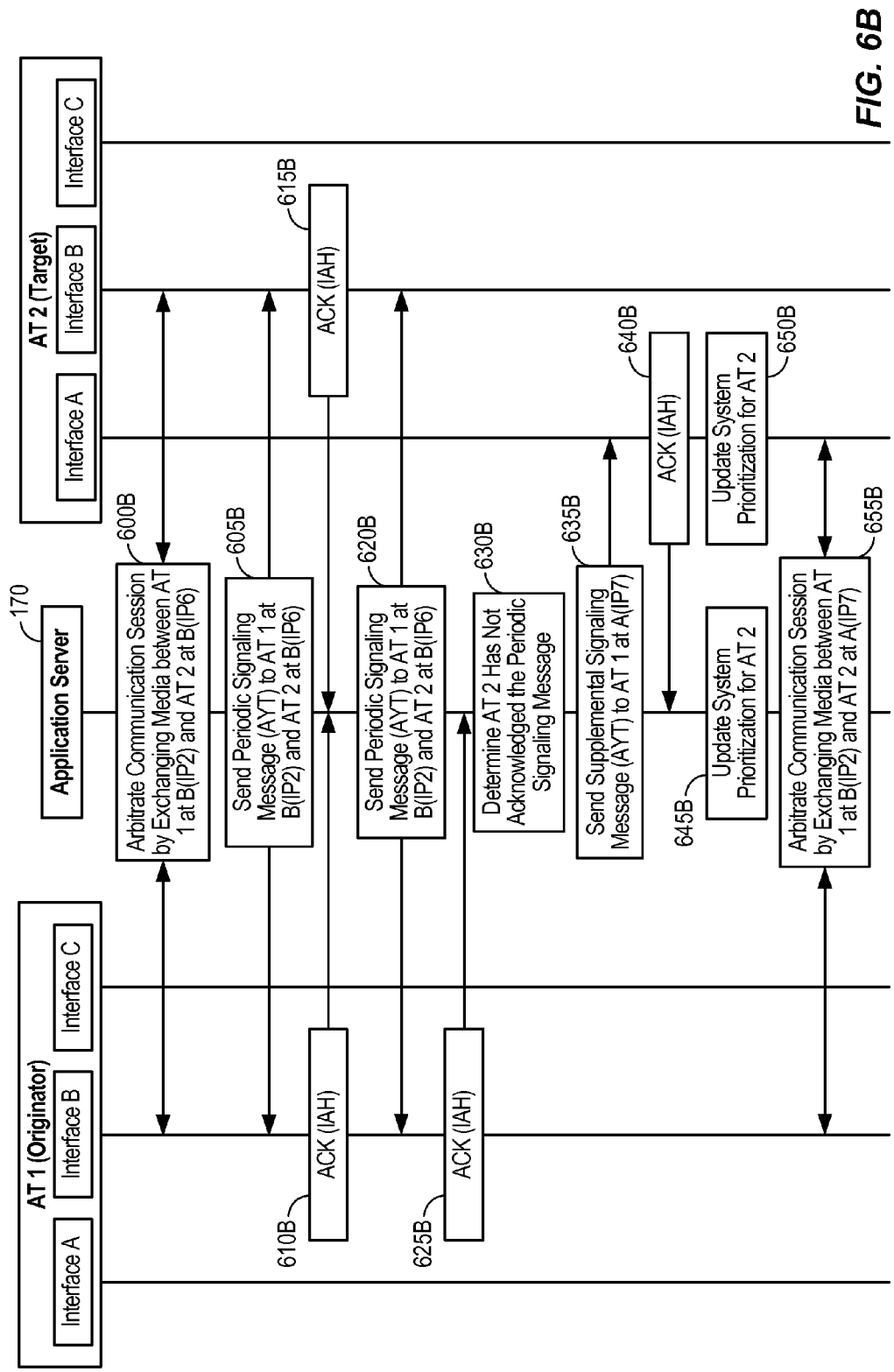
FIG. 6B illustrates a more detailed implementation of the process of FIG. 6A in accordance with an embodiment of the invention.

FIG. 6B illustrates a more detailed implementation example of the process of FIG. 6A in accordance with an embodiment of the invention. Referring to FIG. 6B, assume that the application server 170 is arbitrating the communication session by exchanging media between the call originator AT 1 on system B at IP address IP2 and AT 2 on system B at IP address IP6, 600B.

In 605B, the application server 170 sends a periodic signaling message (e.g., an Are You There? (AYT) message, an ICMP echo request message, etc.) to the call originator AT 1 on system B at IP address IP2 and AT 2 on system B at IP address IP6. AT 1 and AT 2 both ACK the periodic signaling message (e.g., by sending I Am Here (IAH) messages, by sending ICMP echo response messages, etc.), 610B and 615B. At some later point in time, the application server 170 sends another periodic signaling message to the call originator AT 1 on system B at IP address IP2 and AT 2 on system B at IP address IP6, 620B. This time, only AT 1 ACKs the periodic signaling message, 625B.

After a timeout period, the application server 170 determines that AT 2 has not ACKed the periodic signaling message from 620B, 630B. Accordingly, the application server 170 attempts to ping AT 2 on AT 2's next highest-priority system (i.e., system A) by sending a supplemental signaling message to AT 1 on system A at IP address IP7, 635B. AT 2 ACKs the supplemental signaling message on system A, 640B, and both AT 2 and the application server 170 update their system prioritizations such that the priority of system A is increased while the priority of system B is demoted, 645B and 650B. Thereafter, the application server 170 arbitrates the communication session by exchanging media between the call originator AT 1 on system B at IP address IP2 and AT 2 on system A at IP address IP7, 655B.

As will be appreciated by one of ordinary skill in the art, FIGS. 6A and 6B illustrate embodiments by which the application server 170 determines one or more ATs to be non-responsive on a currently supported system, and in response to this determination the application server 170 attempts to ping the non-responsive AT(s) on lower-priority systems iteratively until the AT(s) acknowledge the ping (i.e., supplemental signaling message). In alternative embodiments, the session participants may trigger a system-switch on their own initiative, as will be described below with respect to FIGS. 7A through 7C.

Figure 7A:
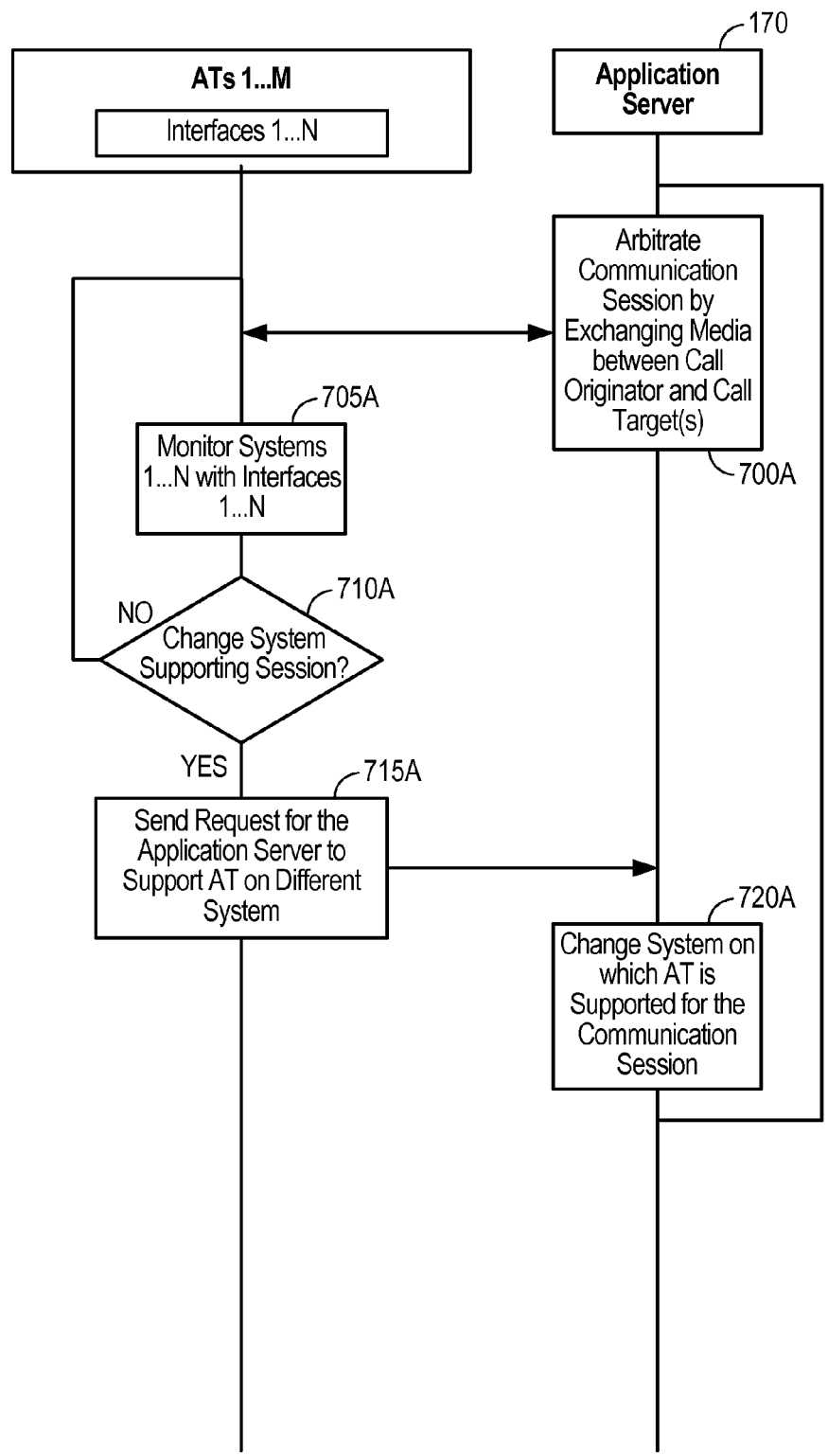
FIG. 7A illustrates a continuation of FIG. 5A in accordance with another embodiment of the invention.

FIG. 7A illustrates a continuation of FIG. 5A in accordance with another embodiment of the invention. Accordingly, in 700A, assume that the application server 170 is arbitrating the communication session by exchanging media between the call originator AT 1 and the call targets ATs 2 . . . M. As will be appreciated, 700A of FIG. 7A generally corresponds to 555A of FIG. 5A.

During the communication session, each of ATs 1 . . . M monitor systems 1 . . . N with system interfaces 1 . . . N, respectively, 705A. For example, the monitoring of 705A may include decoding the media stream of the communication session carried on one of systems 1 . . . N while tracking one or more performance parameters (e.g., pilot signal strength, etc.) associated with the other systems of systems 1 . . . N. Based on the system monitoring of 705A, each of ATs 1 . . . M determines whether to change the system supporting its current session in 710A. For example, if a given AT among ATs 1 . . . M determines that the pilot signal strength of a different system is stronger than the current system supporting the communication session in 705A, the given AT may determine to switch to the different system. In another example, if a given AT among ATs 1 . . . M is moving and the monitoring of 705A determines that the given AT has entered a location where the current system supporting the communication session is either unavailable or more expensive than another available system, the given AT may determine to switch to the other available system. In a further example, the determination of 710A may correspond to a repeating of the determination of 405A discussed above with respect to FIG. 4A, except that the determination of 710A occurs when the given AT is already engaged in an active communication session based on more up-to-date information.

If ATs 1 . . . M determine not to change systems in 710A, the process returns to 705A and ATs 1 . . . M continue to monitor the communication session on the same system, while also tracking the performance expectation on other systems. Otherwise, if one or more of ATs 1 . . . M determine to change systems in 710A, the one or more ATs send a system-change request to the application server 170 that requests the application server 170 to support the communication session on a different system for the one or more ATs, 715A. The application server 170 receives the system-change request(s) and changes the system upon which the communication session is supported for the one or more ATs, 720A. While not shown in FIG. 7A, the one or more ATs and the application server 170 may also update the system prioritizations for the one or more ATs such that the system requested by the system-change request in 715A is set as the new highest-priority system.

Figure 7B:
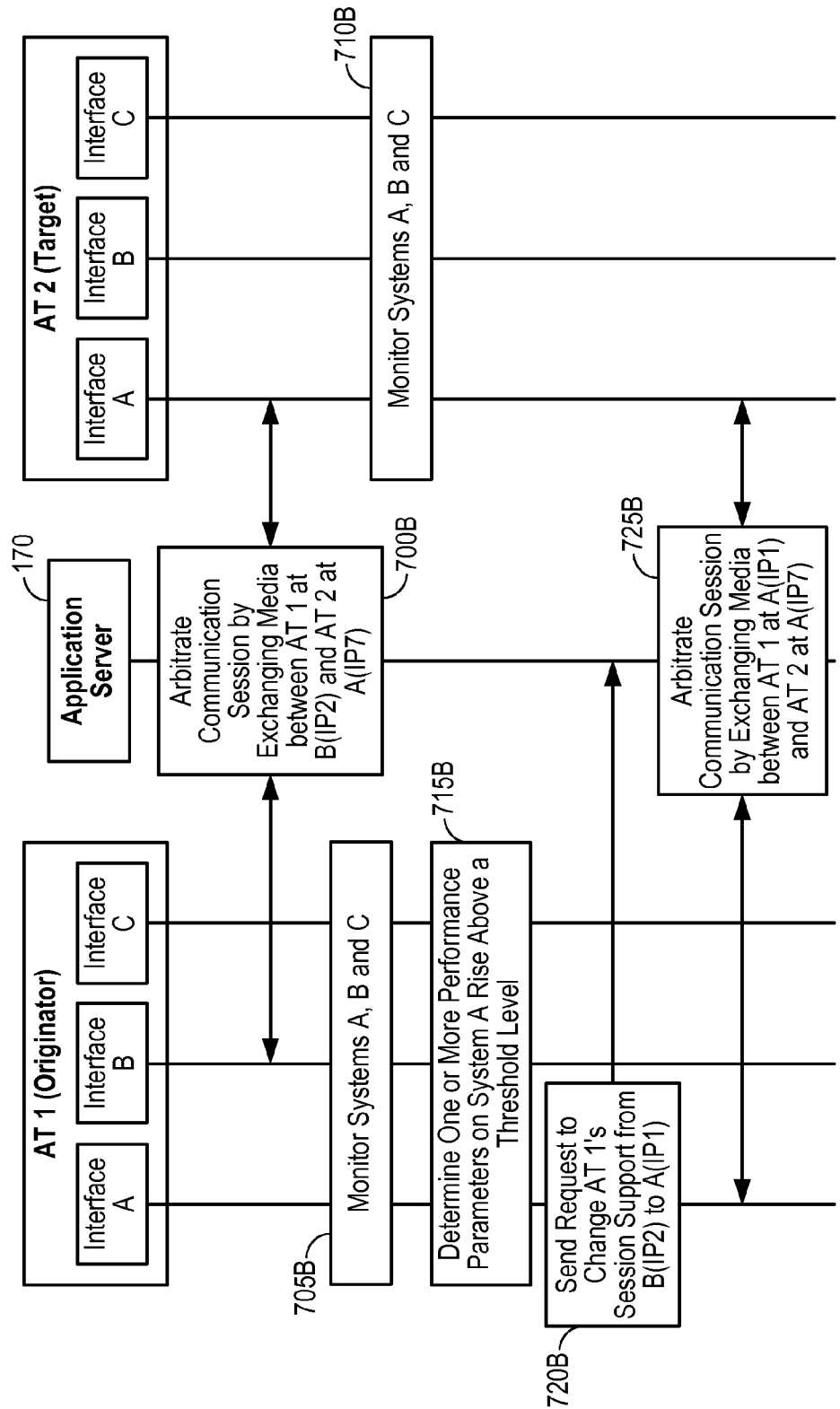
FIG. 7B illustrates a more detailed implementation of the process of FIG. 7A in accordance with an embodiment of the invention.

FIG. 7B illustrates a more detailed implementation example of the process of FIG. 7A in accordance with an embodiment of the invention. Referring to FIG. 7B, assume that the application server 170 is arbitrating the communication session by exchanging media between the call originator AT 1 on system B at IP address IP2 and AT 2 on system B at IP address IP6, 700B. ATs 1 and 2 monitor systems A, B and C during the communication session, 705B and 710B. In particular, AT 1 monitors one or more performance parameters associated with systems A and C while monitoring the media flow (e.g., and/or transmitting the media flow, if AT 1 is a half-duplex floor-holder or full-duplex session participant) of the communication session on system B in 705B, and AT 2 monitors one or more performance parameters associated with systems B and C while monitoring the media flow (e.g., and/or transmitting the media flow, if AT 2 is a half-duplex floor-holder or full-duplex session participant) of the communication session on system A in 710B.

During the monitoring of 705B, assume that AT 1 determines that one or more monitored performance parameters rise above a threshold level, 715B. For example, if the one or more monitored performance parameters include a pilot signal strength level, then system A's pilot signal strength level may rise above the connection strength that is obtained on system B and/or some other signal threshold strength level (e.g., which can be set higher than system B's strength, to avoid quick transitions between systems in a boundary area). Based on the determination from 715B, AT 1 determines to transition its communication session from system B to system A. Accordingly, AT 1 sends a system-change request (e.g., a For Your Information (FYI) (IP_Update IP1) message, an ARP Announcement message in an Internet domain, etc.) to the application server 170 to request the system transition from system B on IP address IP2 to system A at IP address IP 1, 720B. The application server 170 receives the request and thereafter supports AT 1 on the requested system, 725B.

FIG. 7B illustrates an example whereby AT 1 requests a system change without AT 1's associated system prioritization being updated. In other words, while the application server 170 supports the communication session for AT 1 on system A at IP address IP1 in 725B, the system prioritization for AT 1 is unchanged such that subsequent attempts to contact AT 1 are over system B at IP address IP2. FIG. 7C illustrate an alternative manner of a handset-initiated system-change embodiment whereby the system prioritization for AT 1 is changed in response to a request to transition to another system.

Referring to FIG. 7C, 700C through 715C correspond to 700B through 715B of FIG. 7B, respectively, and as such will not be discussed further for the sake of brevity. Based on the determination from 715C, AT 1 determines to transition its communication session from system B to system A. Next, instead of an explicit request to transition to system A at IP address IP1 as in 720B (e.g., via an FYI_Update(IP1) message, an ARP Announcement message in an Internet domain, etc.), AT 1 sends a supplemental registration message over system A configured as [A(IP1); B(IP2); C(IP3)] to indicate the updated system prioritization and associated system interface contact information to the application server 170. Thus, the supplemental registration message results in the system prioritizations maintained at AT 1 and the application server 170 to be updated, 725B and 730B, and the application server 170 thereafter supports AT 1 on the requested system, 735B. Thus, while both FIGS. 7B and 7C result in the application server 170 switching AT 1's session support to a different system, FIG. 7C further modifies the system prioritization such that subsequent contact attempts of AT 1 will also prioritize system A over system B.

Above-described embodiments of the invention have generally been directed to implementations whereby, at any given time during a communication session, each AT is connected to the application server 170 over a single system among the available systems 1 . . . N. However, to further improve reliability of the communication session, the communication session can at least temporarily support the communication session on one or more of ATs 1 . . . M on multiple systems, as will be described below with respect to FIGS. 8A through 8C.

Figure 8A:
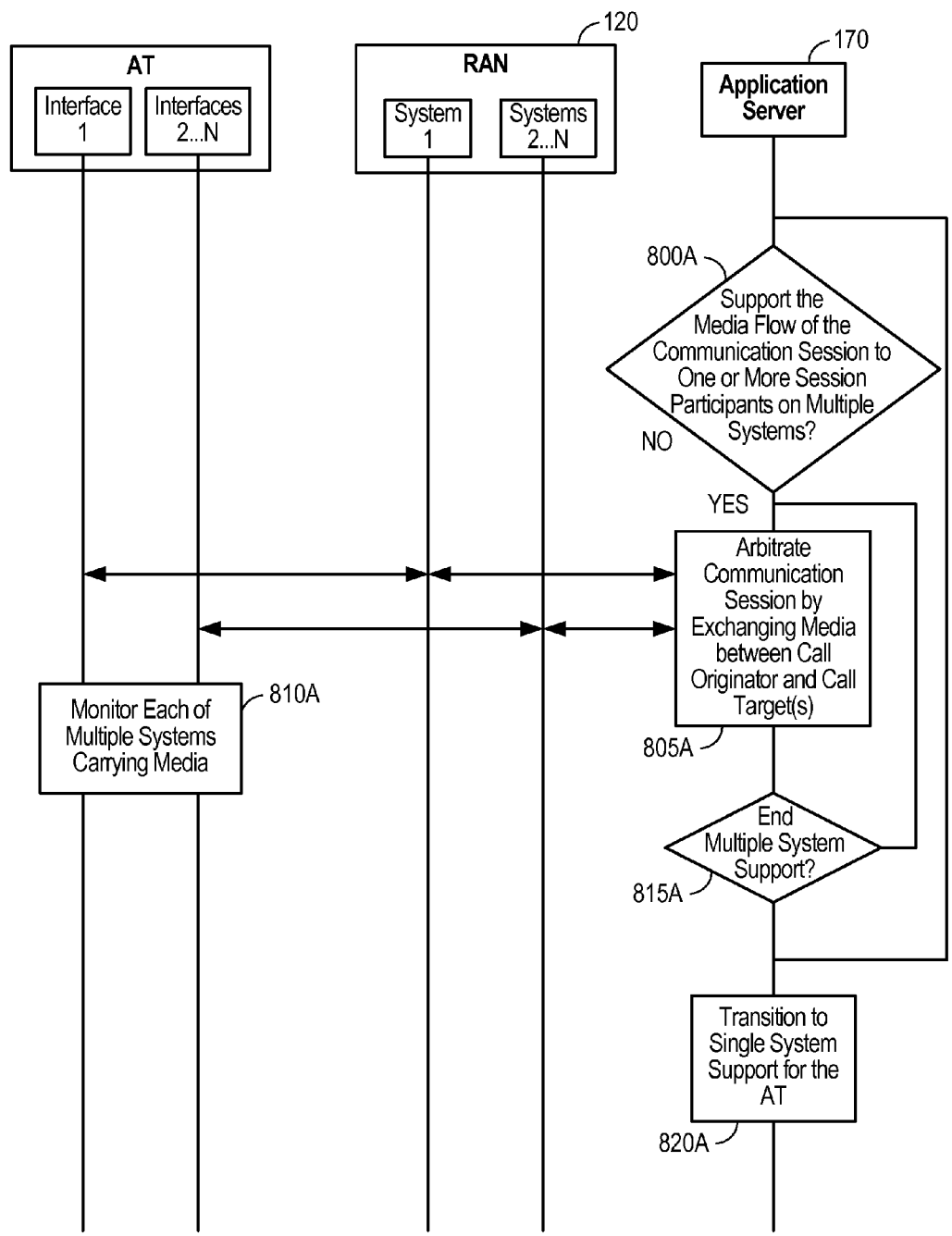
FIG. 8A illustrates a selective media flow arbitration by the application server whereby the application server can provide and/or receive a media from to/from one or more access terminals on multiple systems in accordance with an embodiment of the invention.
Figure 8B:
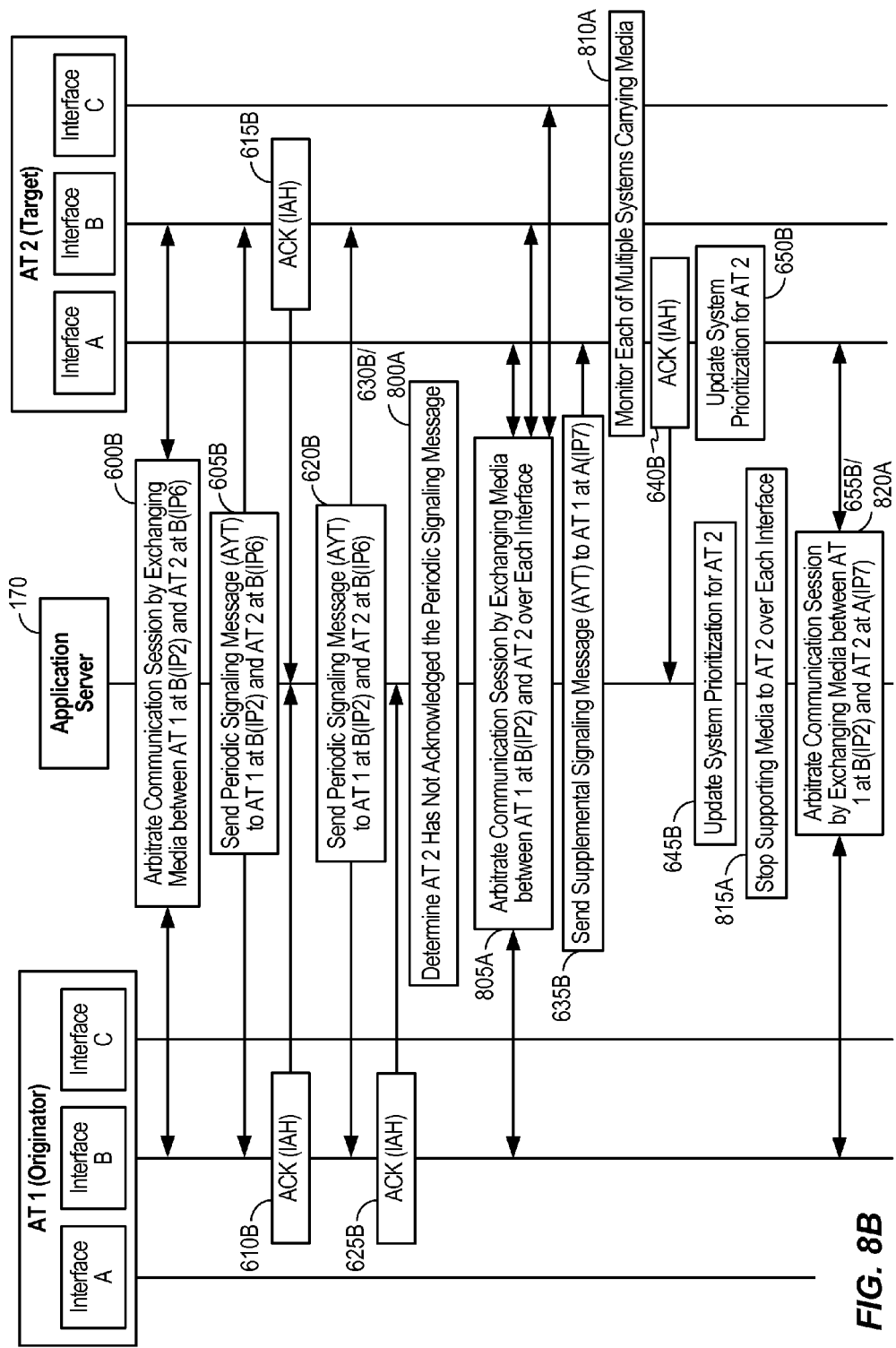
FIG. 8B illustrates a more detailed implementation of FIG. 8A whereby the process of FIG. 8A is integrated into the process of FIG. 6B in accordance with an embodiment of the invention.
Figure 8C:
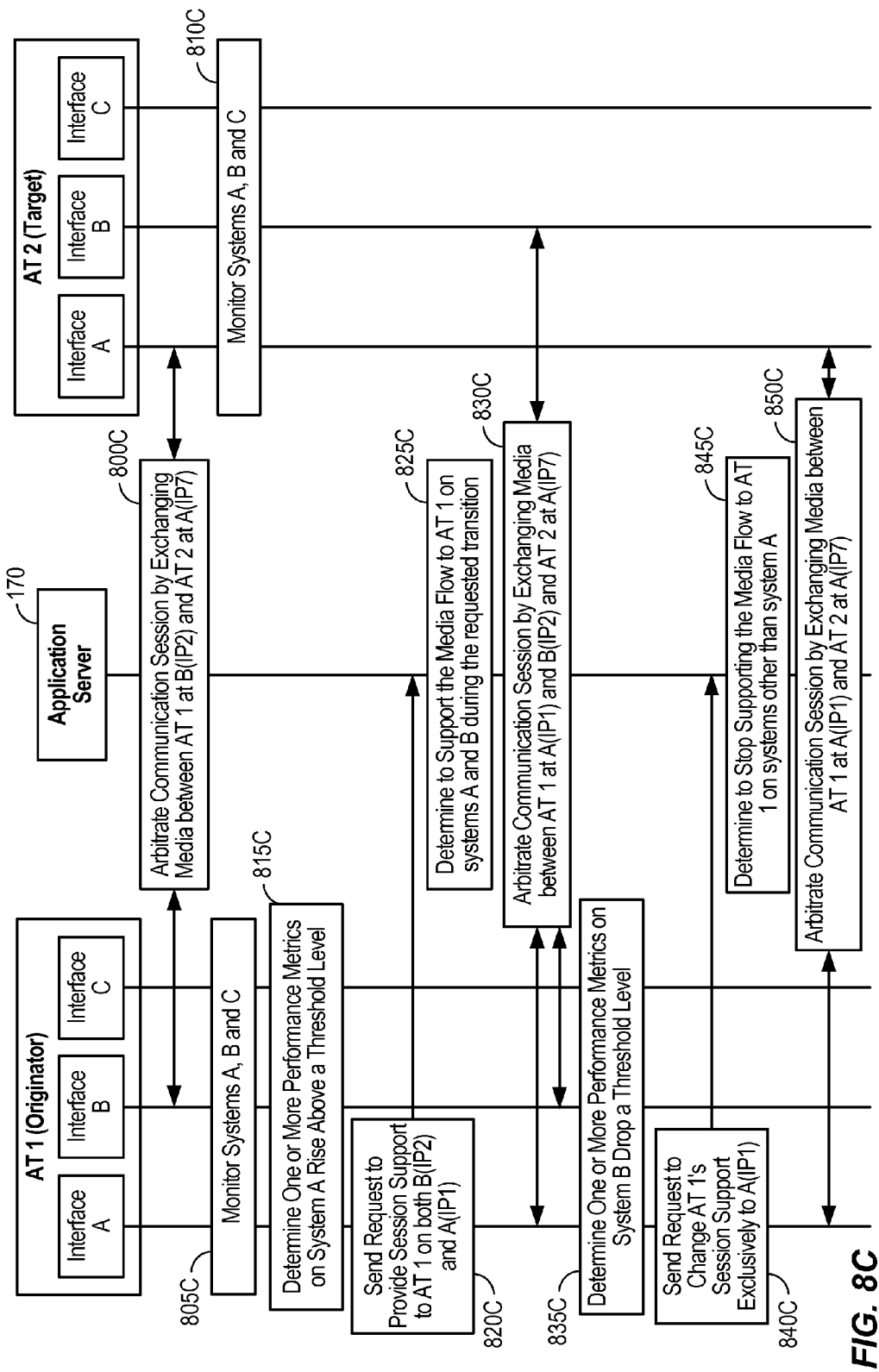
FIG. 8C illustrates a more detailed implementation of FIG. 8A whereby the process of FIG. 8A is integrated into the process of FIG. 7B in accordance with an embodiment of the invention.

FIG. 8A illustrates a selective media flow arbitration by the application server 170 whereby the application server 170 can provide and/or receive a media from to/from one or more access terminals on multiple systems in accordance with an embodiment of the invention. The process of FIG. 8A is described broadly, as the process can potentially be performed at different times during the communication session. For example, multiple systems can be used to exchange media to a particular AT (i) upon set-up of the communication session, (ii) during a handoff of an AT from one system or another, (iii) upon request by the AT, or (iv) even throughout the entire session (e.g., in which case FIG. 8A would execute at session set-up and block 815A would not evaluate to a determination to end multiple system support until session termination). FIGS. 8B and 8C illustrate two examples where the process of FIG. 8A is illustrated within above-described FIGS. 6B and 7B, respectively, to provide examples of how FIG. 8A may be integrated into other embodiments. However, it will be appreciated that other manners of integrating the process of FIG. 8A into the above-described embodiments of the invention can also be used, such that multiple-system support can be achieved at any point during the communication session.

Referring to FIG. 8A, the application server 170 determines whether to support the communication session for a given AT on multiple systems, 800A (e.g., on each system that the given AT can be contacted upon, on more than one and less than all systems in the given AT's system prioritization, etc.). As noted in the preceding paragraph, reasons as to why the application server 170 may support the given AT on multiple systems include increasing reliability during session set-up, reducing an occurrence of dropped calls when handing off the given AT from one system to another system and/or providing multiple-system support to the given AT throughout the whole session if sufficient resources are available. Further, the evaluation of 800A may be performed periodically, or can be triggered by a triggering event (e.g., a request from the given AT to switch systems, a request from the given AT to provide multiple-system support, a determination by the application server 170 itself to switch systems and/or provide multi-system support, etc.).

If the application server 170 determines not to support the communication session for a given AT on multiple systems in 800A, the application server 170 advances to 820A and provides support for the given AT on a single system. Otherwise, if the application server 170 determines to support the communication session for a given AT on multiple systems in 800A, the application server 170 modifies its arbitration of the communication session such that the given AT and the application server 170 communicate over two or more systems, 805A. For example, in 805A, the application server 170 can send the same media to the given AT redundantly over two different systems to increase the given AT's success rate in decoding the media flow. In another example, the application server 170 can send different media to the given AT over the different systems to increase the level of bandwidth between the application server 170 and the given AT. Likewise, if the given AT is a floor-holder for a half-duplex call or a participant in the full-duplex session, the given AT can likewise send media on the reverse link to the application server 170 over the different systems in 805A, either redundantly or with different media to increase reverse link bandwidth. Accordingly, the given AT monitors each of the multiple systems carrying the media flow in 810A.

In 815A, the application server 170 determines whether to end multiple system support for the given AT. For example, the application server 170 can start a timer when multiple system support is allocated to the given AT in 805A, and can determine to terminate the multiple system support when the timer exceeds a given expiration threshold. If the application server 170 determines not to terminate multiple system support for the given AT, the process returns to 805A and the session continues with media and/or signaling being exchanged with the given AT on multiple systems. Otherwise, if the application server 170 determines to terminate multiple system support for the given AT, the application server 170 transitions to providing single-system support for the communication session to the given AT (e.g., such as in 555A of FIG. 5A, 590B of FIG. 5B, 600A of FIG. 6A, 600B or 655B of FIG. 6B, 700A of FIG. 7A, 700B or 725B of FIG. 7B and/or 700C or 735C of FIG. 7C).

FIG. 8B illustrates a more detailed implementation of FIG. 8A, whereby the process of FIG. 8A is integrated into the embodiment described above with respect to FIG. 6B. Accordingly, referring to FIG. 8B, 600B through 630B correspond to their descriptions from FIG. 6B above, except that the determination at 630B that AT 2 has not ACKed the periodic signaling message also triggers a determination, as in 800A, to provide the media flow to AT 2 on multiple systems at least until the application server 170 can verify that AT 2 is present on a supported system. Accordingly, after detecting that AT 2 is not capable of ACKing the periodic signaling message on system B in 630B, the application server 170 begins forwarding the media flow to AT 2 on each of systems A, B and C, 805A. The application server 170 then provides the supplemental signaling message to AT 2 on the next or second-highest priority system, 635B, which is system A in this example. When AT 2 detects that a supplemental signaling message is received on an unexpected system in 810A, AT 2 interprets this event as an indication that the application server 170 has been unable to contact AT 2 on system B, which is AT 2's highest priority system at this point, and that the media flow will at least temporarily be provided on each of AT 2's systems. Thereby, AT 2 attempts to monitor the media flows on each system in 810A, and AT 2 also ACKs the signaling message on system A in 640B to inform the application server 170 that at least system A can still be used to contact AT 2.

In the example of FIG. 8B, after the ACK on system A is received at the application server 170, the application server 170 can stop supporting the media flow to AT 2 on systems other than system A, and instead can limit its media flow forwarding to AT 2 on system A only to conserve system resources, 815A. Thereby, the application server 170 transitions to single-system support for AT 2 on system A in 655B, which corresponds to 820A of FIG. 8A.

FIG. 8C illustrates a more detailed implementation of FIG. 8A, whereby the process of FIG. 8A is integrated into the embodiment described above with respect to FIG. 7B. Accordingly, referring to FIG. 8C, 800C through 810C correspond to 700B through 710B, respectively, of FIG. 7B. However, after determining that that one or more performance metrics rises above the threshold level in 815C, AT 1 sends a message requesting that the application server 170 support the communication session on both system B at IP address IP2 and system A at IP address LPL 820C. The application server 170 receives the message of 820C and determines to provide the media flow to AT 1 on both systems A and B, 825C.

Accordingly, the application server 170 begins forwarding the media flow to AT 1 on each of systems A and B but not system C (e.g., because support on system C was not requested in the message of 820C), and also continues to provide the media flow to AT 2 on system A, 830C. While not shown in FIG. 8C, it may be assumed that AT 1 monitors the media flow on both systems A and B in 830C. It may also be assumed that the application server 170 sends periodic signaling messages to AT 1 on both systems A and B when multiple-system support is provided to ensure that AT 1 is receiving the media flow on both of the systems, and that AT 1 successfully ACKs these periodic signaling messages.

Next, at some later point in time, AT 1 determines that one or more performance metrics on system B drop below a threshold level, 835C (e.g., which may be equal to or different than the threshold level associated with 815C, and may correspond to the same or different performance parameters as in 815C). Next, responsive to the determination of 835C, AT 1 sends a message requesting that the application server 170 support the communication session exclusively on and system A at IP address IP1, 840C. Upon receiving the message of 840C, the application server 170 stops supporting the media flow to AT 1 on system A and restricts media flow support for AT 1's communication session to system A, 845C. Thereafter, the application server 170 transitions to single-system support for AT 1 on system A in 850C.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of registering a priority of physical-layer systems with an application server within a wireless communications system, comprising:
   registering an access terminal with each of a plurality of systems, each of the plurality of systems associated with a different physical-layer;
   obtaining contact information by which the access terminal can be contacted over each of the plurality of systems;
   determining a system prioritization of each of the plurality of systems for the access terminal;
   sending a registration message from the access terminal to the application server to register the access terminal with the application server that is configured to arbitrate communication sessions for the access terminal, wherein the registration message includes (i) the system prioritization and (ii) the contact information of each of the plurality of systems, wherein the contact information permits data sent over a system interface corresponding to one of the plurality of systems to be recognized by a corresponding system at a radio access network (RAN) and permits a corresponding system at the RAN to send data to the corresponding system interface at the access terminal;
   determining to update the system prioritization with the application server, wherein the determination to update the system prioritization is automatically performed by the access terminal in response to a triggering event related to at least one of the plurality of systems; and
   sending a supplemental registration message from the access terminal to the application server to re-register the access terminal with the application server by reporting to the application server an updated system prioritization.

2. The method of claim 1, wherein the registering step is conducted between the access terminal and the application server over a highest-priority system among the plurality of systems based on the determined system prioritization.

3. The method of claim 1, further comprising:
   determining to update the contact information with the application server.

4. The method of claim 3, wherein the re-registering comprises re-registering the access terminal with the application server by reporting, to the application server, updated contact information.

5. The method of claim 3, wherein the re-registering step is conducted between the access terminal and the application server over a highest-priority system among the plurality of systems based on the updated system prioritization.

6. The method of claim 1, wherein the plurality of systems include one or more of a WiFi system, a CDMA2000 1x system, a frequency division multiple access (FDMA) system, a time division multiple access (TDMA) system, a orthogonal frequency division multiplexing (OFDM) system, a long-term evolution (LTE) system and/or a broadcast and multicast service (BCMCS) system.

7. The method of claim 1, wherein the triggering event comprises at least one of (i) a change of performance on one or more of the systems, (ii) a change in a cost of one or more of the systems, (iii) a change in the contact information for one or more of the system interfaces, (iv) a de-registration of the access terminal from one or more of the systems, (v) a registration of the access terminal with one or more new systems, and (vi) an entry or exit by the access terminal to or from a defined location region.

8. A method of registering a priority of physical-layer systems for an access terminal within a wireless communications system, comprising:
   receiving at an application server from the access terminal a registration message including a request to register a system prioritization of a plurality of systems and contact information by which the access terminal can be contacted over each of the plurality of systems, each of the plurality of systems associated with a different physical-layer, wherein the contact information permits data sent over a system interface corresponding to one of the plurality of systems to be recognized by a corresponding system at a radio access network (RAN) and permits a corresponding system at the RAN to send data to the corresponding system interface at the access terminal;
   storing the system prioritization and contact information of the access terminal;
   receiving at the application server from the access terminal a supplemental registration message including a request to update the system prioritization with the application server, wherein the request to update the system prioritization is automatically generated by the access terminal in response to a triggering event related to at least one of the plurality of systems; and
   updating the system prioritization of the access terminal in accordance with the update request.

9. The method of claim 8, wherein the receiving step occurs over a highest-priority system among the plurality of systems based on the determined system prioritization.

10. The method of claim 8, further comprising:
    receiving, from the access terminal, a request to update the contact information with the application server.

11. The method of claim 10, wherein the updating comprises updating the contact information of the access terminal in accordance with the update request.

12. The method of claim 8, wherein the plurality of systems include one or more of a WiFi system, a CDMA2000 1x system, a frequency division multiple access (FDMA) system, a time division multiple access (TDMA) system, a orthogonal frequency division multiplexing (OFDM) system, a long-term evolution (LTE) system and/or a broadcast and multicast service (BCMCS) system.

13. The method of claim 8, wherein the triggering event comprises at least one of a change of performance on one or more of the systems, a change in a cost of one or more of the systems, a change in the contact information for one or more of the system interfaces, a de-registration of the access terminal from one or more of the systems, a registration of the access terminal with one or more new systems, and an entry or exit by the access terminal to or from a defined location region.

14. A method of setting up a communication session in a wireless communications system, comprising:

determining, at an access terminal, to initiate a communication session to be arbitrated by an application server;

determining a system prioritization for a plurality of systems by which the access terminal can contact the application server, each of the plurality of systems associated with a different physical-layer;

sending a registration message to indicate the system prioritization to the application server, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal;

attempting to send a session initiation request to the application server over a highest-priority system based on the system prioritization;

if the attempt is unsuccessful, re-sending the session initiation request on at least one of the plurality of systems other than the highest-priority system; and if one of the attempts to send the session initiation request is successful, selectively updating the system prioritization with the application server such that the system upon which the successful attempt is made corresponds to the highest-priority system in the updated system prioritization and sending a supplemental registration message to indicate the updated system prioritization to the application server, wherein a determination to selectively update the system prioritization is automatically performed by the access terminal in response to a triggering event related to at least one of the plurality of systems.

15. The method of claim 14, wherein the re-sending step occurs after a threshold number of unsuccessful attempts on the highest-priority system.

16. The method of claim 14, wherein the re-sending step occurs on a next-highest priority system based on the system prioritization.

17. The method of claim 14, further comprising:
receiving, from the application server, an acknowledgment of one of the attempts to send or re-send the session initiation request on a given system among the plurality of systems,
wherein the attempt to send or re-send the session initiation request on the given system is determined to be successful for systems upon which the acknowledgment from the application server is received.

18. The method of claim 14, further comprising:
not receiving, from the application server, an acknowledgment of at least one of the attempts to send or re-send the session initiation request on at least one system among the plurality of systems,
wherein the at least one attempt to send or re-send the session initiation request on the at least one system is determined to be unsuccessful for systems upon which the acknowledgment from the application server is not received.

19. The method of claim 14, wherein the selectively updating step does not update the system prioritization if the attempt to send the session initiation request on the highest-priority system is successful.

20. The method of claim 14, wherein the selectively updating step updates the system prioritization if the attempt to send the session initiation request on the highest-priority system is not successful.

21. The method of claim 14, wherein the plurality of systems include one or more of a WiFi system, a CDMA2000 1x system, a frequency division multiple access (FDMA) system, a time division multiple access (TDMA) system, a orthogonal frequency division multiplexing (OFDM) system, a long-term evolution (LTE) system and/or a broadcast and multicast service (BCMCS) system.

22. The method of claim 14, wherein determining the system prioritization corresponds to loading a previously established system prioritization that has already been registered with the application server.

23. The method of claim 14, wherein the triggering event comprises at least one of a change of performance on one or more of the systems, a change in a cost of one or more of the systems, a change in the contact information for one or more of the system interfaces, a de-registration of the access terminal from one or more of the systems, a registration of the access terminal with one or more new systems, and an entry or exit by the access terminal to or from a defined location region.

24. A method of setting up a communication session in a wireless communications system, comprising:
receiving a session initiation request from an access terminal on a given system;
determining whether the given system upon which the session initiation request is received corresponds to a highest-priority system among a previously registered system prioritization for a plurality of systems by which the access terminal can contact an application server, each of the plurality of systems associated with a different physical-layer; and
selectively updating the system prioritization at the application server based on a registration message received from the access terminal indicating the updated system prioritization, such that the system upon which the session initiation request is received corresponds to the highest-priority system in the updated system prioritization, wherein a determination to selectively update the system prioritization is automatically performed by the access terminal in response to a triggering event related to at least one of the plurality of systems, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal.

25. The method of claim 24, further comprising:
sending an acknowledgment of the session initiation request to the access terminal on the given system.

26. The method of claim 24, wherein the selectively updating step does not update the system prioritization if the determining step determines that the given system corresponds to the highest-priority system.

27. The method of claim 24, wherein the selectively updating step updates the system prioritization if the determining step determines that the given system does not correspond to the highest-priority system.

28. The method of claim 24, wherein the plurality of systems include one or more of a WiFi system, a CDMA2000 1x system, a frequency division multiple access (FDMA) system, a time division multiple access (TDMA) system, a orthogonal frequency division multiplexing (OFDM) system, a long-term evolution (LTE) system and/or a broadcast and multicast service (BCMCS) system.

29. The method of claim 24, wherein the triggering event comprises at least one of a change of performance on one or more of the systems, a change in a cost of one or more of the systems, a change in the contact information for one or more of the system interfaces, a de-registration of the access terminal from one or more of the systems, a registration of the access terminal with one or more new systems, and an entry or exit by the access terminal to or from a defined location region.

30. A method of setting up a communication session in a wireless communications system, comprising:
   receiving a session initiation request from an access terminal on a given system;
   receiving a registration message indicating a system prioritization for a plurality of systems by which at least one target associated with the session initiation request can be contacted by an application server, each of the plurality of systems associated with a different physical-layer, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal;
   attempting to send an announce message announcing a communication session to the at least one target over a highest-priority system based on the system prioritization;
   if the attempt is unsuccessful, re-sending the announce message on at least one of the plurality of systems other than the highest-priority system; and
   if one of the attempts to send or re-send the announce message is successful, receiving a supplemental registration message indicating an updated system prioritization at the application server such that the system upon which the successful attempt is made corresponds to the highest-priority system in the updated system prioritization, wherein a determination to selectively update the system prioritization is automatically performed by the access terminal in response to a triggering event related to at least one of the plurality of systems.

31. The method of claim 30, wherein the re-sending step occurs after a threshold number of unsuccessful attempts on the highest-priority system.

32. The method of claim 30, wherein the re-sending step occurs on a next-highest priority system based on the system prioritization.

33. The method of claim 30, further comprising:
   sending an acknowledgment of the session initiation request to the access terminal on the given system.

34. The method of claim 30, further comprising:
   receiving, from the at least one target, an acknowledgment of one of the attempts to send or re-send the announce message,
   wherein the at least one attempt to send or re-send the announce message is determined to be successful for systems upon which the acknowledgment from the at least one target is received.

35. The method of claim 30, further comprising:
   not receiving, from the at least one target, an acknowledgment of at least one of the attempts to send or re-send the announce message on at least one system among the plurality of systems,
   wherein the at least one attempt to send or re-send the announce message is determined to be unsuccessful for systems upon which the acknowledgment from the at least one target is not received.

36. The method of claim 30, wherein the selectively updating step does not update the system prioritization if the attempt to send the announce message on the highest-priority system is successful.

37. The method of claim 30, wherein the selectively updating step updates the system prioritization if the attempt to send the announce message on the highest-priority system is not successful.

38. The method of claim 30, wherein the plurality of systems include one or more of a WiFi system, a CDMA2000 1x system, a frequency division multiple access (FDMA) system, a time division multiple access (TDMA) system, a orthogonal frequency division multiplexing (OFDM) system, a long-term evolution (LTE) system and/or a broadcast and multicast service (BCMCS) system.

39. The method of claim 30, wherein determining the system prioritization corresponds to loading a previously established system prioritization that has already been registered by the at least one target with the application server.

40. The method of claim 30, wherein the triggering event comprises at least one of a change of performance on one or more of the systems, a change in a cost of one or more of the systems, a change in the contact information for one or more of the system interfaces, a de-registration of the access terminal from one or more of the systems, a registration of the access terminal with one or more new systems, and an entry or exit by the access terminal to or from a defined location region.

41. A method of setting up a communication session in a wireless communications system, comprising:
   receiving an announce message announcing a communication session at an access terminal on a given system;
   determining whether the given system upon which the announce message is received corresponds to a highest-priority system among a previously established system prioritization for a plurality of systems by which the access terminal can be contacted by an application server, each of the plurality of systems associated with a different physical-layer; and
   selectively updating the system prioritization with the application server by sending a registration message to indicate the updated system prioritization to the application server, such that the system upon which the announce message is received corresponds to the highest-priority system in the updated system prioritization, wherein a determination to selectively update the system prioritization is automatically performed by the access terminal in response to a triggering event related to at least one of the plurality of systems, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal.

42. The method of claim 41, further comprising:
   sending an acknowledgment of the announce message to the application server on the given system.

43. The method of claim 41, wherein the selectively updating step does not update the system prioritization if the determining step determines that the given system corresponds to the highest-priority system.

44. The method of claim 41, wherein the selectively updating step updates the system prioritization if the determining step determines that the given system does not correspond to the highest-priority system.

45. The method of claim 41, wherein the plurality of systems include one or more of a WiFi system, a CDMA2000 1x system, a frequency division multiple access (FDMA) system, a time division multiple access (TDMA) system, a orthogonal frequency division multiplexing (OFDM) system, a long-term evolution (LTE) system and/or a broadcast and multicast service (BCMCS) system.

46. The method of claim 41, wherein the triggering event comprises at least one of a change of performance on one or more of the systems, a change in a cost of one or more of the systems, a change in the contact information for one or more of the system interfaces, a de-registration of the access terminal from one or more of the systems, a registration of the access terminal with one or more new systems, and an entry or exit by the access terminal to or from a defined location region.

47. An access terminal, comprising:
 means for registering the access terminal with each of a plurality of systems, each of the plurality of systems associated with a different physical-layer;
 means for obtaining contact information by which the access terminal can be contacted over each of the plurality of systems;
 means for determining a system prioritization of each of the plurality of systems for the access terminal;
 means for sending a registration message from the access terminal to an application server to register the access terminal with an application server that is configured to arbitrate communication sessions for the access terminal, wherein the registration message includes (i) the system prioritization and (ii) the contact information of each of the plurality of systems, wherein the contact information permits data sent over a system interface corresponding to one of the plurality of systems to be recognized by a corresponding system at a radio access network (RAN) and permits a corresponding system at the RAN to send data to the corresponding system interface at the access terminal;
 means for determining to update the system prioritization with the application server, wherein the determination to update the system prioritization is automatically performed by the access terminal in response to a triggering event related to at least one of the plurality of systems; and
 means for sending a supplemental registration message from the access terminal to the application server to re-register the access terminal with the application server by reporting to the application server an updated system prioritization.

48. An application server, comprising:
 means for receiving at the application server from an access terminal a registration message including a request to register a system prioritization of a plurality of systems and contact information by which the access terminal can be contacted over each of the plurality of systems, each of the plurality of systems associated with a different physical-layer, wherein the contact information permits data sent over a system interface corresponding to one of the plurality of systems to be recognized by a corresponding system at a radio access network (RAN) and permits a corresponding system at the RAN to send data to the corresponding system interface at the access terminal;
 means for storing the system prioritization and contact information of the access terminal;
 means for receiving at the application server from the access terminal a supplemental registration message including a request to update the system prioritization with the application server, wherein the request to update the system prioritization is automatically generated by the access terminal in response to a triggering event related to at least one of the plurality of systems; and
 means for updating the system prioritization of the access terminal in accordance with the update request.

49. An access terminal, comprising:
 means for determining to initiate a communication session to be arbitrated by an application server;
 means for determining a system prioritization for a plurality of systems by which the access terminal can contact the application server, each of the plurality of systems associated with a different physical-layer;
 means for sending a registration message to indicate the system prioritization to the application server, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal;
 means for attempting to send a session initiation request to the application server over a highest-priority system based on the system prioritization;
 means for, if the attempt is unsuccessful, re-sending the session initiation request on at least one of the plurality of systems other than the highest-priority system; and
 means for, if one of the attempts to send the session initiation request is successful, selectively updating the system prioritization with the application server such that the system upon which the successful attempt is made corresponds to the highest-priority system in the updated system prioritization and sending a supplemental registration message to indicate the updated system prioritization to the application server, wherein a determination to selectively update the system prioritization is automatically performed by the access terminal in response to a triggering event related to at least one of the plurality of systems.

50. An application server, comprising:
 means for receiving a session initiation request from an access terminal on a given system;
 means for determining whether the given system upon which the session initiation request is received corresponds to a highest-priority system among a previously registered system prioritization for a plurality of systems by which the access terminal can contact the application server, each of the plurality of systems associated with a different physical-layer; and
 means for selectively updating the system prioritization at the application server based on a registration message received from the access terminal indicating the updated system prioritization, such that the system upon which the session initiation request is received corresponds to the highest-priority system in the updated system prioritization, wherein a determination to selectively update the system prioritization is automatically performed by the access terminal in response to a triggering event related to at least one of the plurality of systems, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal.

51. An application server, comprising:
means for receiving a session initiation request from an access terminal on a given system;
means for receiving a registration message indicating a system prioritization for a plurality of systems by which at least one target associated with the session initiation request can be contacted by the application server, each of the plurality of systems associated with a different physical-layer, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal;
means for attempting to send an announce message announcing a communication session to the at least one target over a highest-priority system based on the system prioritization;
means for, if the attempt is unsuccessful, re-sending the announce message on at least one of the plurality of systems other than the highest-priority system; and
means for, if one of the attempts to send or re-send the announce message is successful, receiving a supplemental registration message indicating an updated system prioritization at the application server such that the system upon which the successful attempt is made corresponds to the highest-priority system in the updated system prioritization, wherein a determination to selectively update the system prioritization is automatically performed by the access terminal in response to a triggering event related to at least one of the plurality of systems.

52. An access terminal, comprising:
means for receiving an announce message announcing a communication session on a given system;
means for determining whether the given system upon which the announce message is received corresponds to a highest-priority system among a previously established system prioritization for a plurality of systems by which the access terminal can be contacted by an application server, each of the plurality of systems associated with a different physical-layer; and
means for selectively updating the system prioritization with the application server by sending a registration message to indicate the updated system prioritization to the application server, such that the system upon which the announce message is received corresponds to the highest-priority system in the updated system prioritization, wherein a determination to selectively update the system prioritization is automatically performed by the access terminal in response to a triggering event related to at least one of the plurality of systems, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal.

53. An access terminal, comprising:
logic configured to register the access terminal with each of a plurality of systems, each of the plurality of systems associated with a different physical-layer;
logic configured to obtain contact information by which the access terminal can be contacted over each of the plurality of systems;
logic configured to determine a system prioritization of each of the plurality of systems for the access terminal;
logic configured to send a registration message from the access terminal to an application server to register the access terminal with an application server that is configured to arbitrate communication sessions for the access terminal, wherein the registration message includes (i) the system prioritization and (ii) the contact information of each of the plurality of systems, wherein the contact information permits data sent over a system interface corresponding to one of the plurality of systems to be recognized by a corresponding system at a radio access network (RAN) and permits a corresponding system at the RAN to send data to the corresponding system interface at the access terminal;
logic configured to determine to update the system prioritization with the application server, wherein the determination to update the system prioritization is automatically performed by the access terminal in response to a triggering event related to at least one of the plurality of systems; and
logic configured to send a supplemental registration message from the access terminal to the application server to re-register the access terminal with the application server by reporting to the application server an updated system prioritization.

54. An application server, comprising:
logic configured to receive at the application server from an access terminal a registration message including a request to register a system prioritization of a plurality of systems and contact information by which the access terminal can be contacted over each of the plurality of systems, each of the plurality of systems associated with a different physical-layer, wherein the contact information permits data sent over a system interface corresponding to one of the plurality of systems to be recognized by a corresponding system at a radio access network (RAN) and permits a corresponding system at the RAN to send data to the corresponding system interface at the access terminal;
logic configured to store the system prioritization and contact information of the access terminal;
logic configured to receive at the application server from the access terminal a supplemental registration message including a request to update the system prioritization with the application server, wherein the request to update the system prioritization is automatically generated by the access terminal in response to a triggering event related to at least one of the plurality of systems; and
logic configured to update the system prioritization of the access terminal in accordance with the update request.

55. An access terminal, comprising:
logic configured to determine to initiate a communication session to be arbitrated by an application server;
logic configured to determine a system prioritization for a plurality of systems by which the access terminal can contact the application server, each of the plurality of systems associated with a different physical-layer;
logic configured to send a registration message to indicate the system prioritization to the application server, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal;

logic configured to attempt to send a session initiation request to the application server over a highest-priority system based on the system prioritization;

logic configured to, if the attempt is unsuccessful, re-send the session initiation request on at least one of the plurality of systems other than the highest-priority system; and logic configured to, if one of the attempts to send the session initiation request is successful, selectively update the system prioritization with the application server such that the system upon which the successful attempt is made corresponds to the highest-priority system in the updated system prioritization and send a supplemental registration message to indicate the updated system prioritization to the application server, wherein a determination to selectively update the system prioritization is automatically performed by the access terminal in response to a triggering event related to at least one of the plurality of systems; and wherein the application server is configured to arbitrate the communication session between the access terminal and one of the plurality of systems based on the system prioritization reported to the application server.

56. An application server, comprising:

logic configured to receive a session initiation request from an access terminal on a given system;

logic configured to determine whether the given system upon which the session initiation request is received corresponds to a highest-priority system among a previously registered system prioritization for a plurality of systems by which the access terminal can contact the application server, each of the plurality of systems associated with a different physical-layer; and logic configured to selectively update the system prioritization at the application server based on a registration message received from the access terminal indicating the updated system prioritization, such that the system upon which the session initiation request is received corresponds to the highest-priority system in the updated system prioritization, wherein a determination to selectively update the system prioritization is automatically performed by the access terminal in response to a triggering event related to at least one of the plurality of systems, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal.

57. An application server, comprising:

logic configured to receive a session initiation request from an access terminal on a given system;

logic configured to receive a registration message indicating a system prioritization for a plurality of systems by which at least one target associated with the session initiation request can be contacted by the application server, each of the plurality of systems associated with a different physical-layer, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal;

logic configured to attempt to send an announce message announcing a communication session to the at least one target over a highest-priority system based on the system prioritization;

logic configured to, if the attempt is unsuccessful, re-send the announce message on at least one of the plurality of systems other than the highest-priority system; and logic configured to, if one of the attempts to send or re-send the announce message is successful, receive a supplemental registration message indicating an updated system prioritization at the application server such that the system upon which the successful attempt is made corresponds to the highest-priority system in the updated system prioritization, wherein a determination to selectively update the system prioritization is automatically performed by the access terminal in response to a triggering event related to at least one of the plurality of systems.

58. An access terminal, comprising:

logic configured to receive an announce message announcing a communication session on a given system;

logic configured to determine whether the given system upon which the announce message is received corresponds to a highest-priority system among a previously established system prioritization for a plurality of systems by which the access terminal can be contacted by an application server, each of the plurality of systems associated with a different physical-layer; and logic configured to selectively update the system prioritization with the application server by sending a registration message to indicate the updated system prioritization to the application server, such that the system upon which the announce message is received corresponds to the highest-priority system in the updated system prioritization, wherein a determination to selectively update the system prioritization is automatically performed by the access terminal in response to a triggering event related to at least one of the plurality of systems, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal.

59. A non-transitory computer-readable storage medium, comprising instructions, which, when executed by an access terminal, cause the access terminal to perform operations, the instructions comprising:

program code to register an access terminal with each of a plurality of systems, each of the plurality of systems associated with a different physical-layer;

program code to obtain contact information by which the access terminal can be contacted over each of the plurality of systems;

program code to determine a system prioritization of each of the plurality of systems for the access terminal;

program code to send a registration message from the access terminal to an application server to register the access terminal with the application server that is configured to arbitrate communication sessions for the access terminal, wherein the registration message includes (i) the system prioritization and (ii) the contact information of each of the plurality of systems, wherein the contact information permits data sent over a system interface corresponding to one of the plurality of systems to be recognized by a corresponding system at a radio access network (RAN) and permits a corresponding system at the RAN to send data to the corresponding system interface at the access terminal;

program code to determine to update the system prioritization with the application server, wherein the determination to update the system prioritization is automatically performed by the access terminal in response to a triggering event related to at least one of the plurality of systems; and program code to send a supplemental registration message from the access terminal to the application server to re-register the access terminal with the application server by reporting to the application server an updated system prioritization.

60. A non-transitory computer-readable storage medium, comprising instructions, which, when executed by an application server, cause the application server to perform operations, the instructions comprising:

program code to receive at the application server from an access terminal a registration message including a request to register a system prioritization of a plurality of systems and contact information by which the access terminal can be contacted over each of the plurality of systems, each of the plurality of systems associated with a different physical-layer, wherein the contact information permits data sent over a system interface corresponding to one of the plurality of systems to be recognized by a corresponding system at a radio access network (RAN) and permits a corresponding system at the RAN to send data to the corresponding system interface at the access terminal;

program code to store the system prioritization and contact information of the access terminal;

program code to receive at the application server from the access terminal a supplemental registration message including a request to update the system prioritization with the application server, wherein the request to update the system prioritization is automatically generated by the access terminal in response to a triggering event related to at least one of the plurality of systems; and program code to update the system prioritization of the access terminal in accordance with the update request.

61. A non-transitory computer-readable storage medium, comprising instructions, which, when executed by an access terminal, cause the access terminal to perform operations, the instructions comprising:

program code to determine to initiate a communication session to be arbitrated by an application server;

program code to determine a system prioritization for a plurality of systems by which the access terminal can contact the application server, each of the plurality of systems associated with a different physical-layer;

program code to send a registration message to indicate the system prioritization to the application server, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal;

program code to attempt to send a session initiation request to the application server over a highest-priority system based on the system prioritization;

program code to, if the attempt is unsuccessful, re-send the session initiation request on at least one of the plurality of systems other than the highest-priority system; and program code to, if one of the attempts to send the session initiation request is successful, selectively update the system prioritization with the application server such that the system upon which the successful attempt is made corresponds to the highest-priority system in the updated system prioritization and send a supplemental registration message to indicate the updated system prioritization to the application server, wherein a determination to selectively update the system prioritization is automatically performed by the access terminal in response to a triggering event related to at least one of the plurality of systems.

62. A non-transitory computer-readable storage medium, comprising instructions, which, when executed by an application server, cause the application server to perform operations, the instructions comprising:

program code to receive a session initiation request from an access terminal on a given system;

program code to determine whether the given system upon which the session initiation request is received corresponds to a highest-priority system among a previously registered system prioritization for a plurality of systems by which the access terminal can contact the application server, each of the plurality of systems associated with a different physical-layer; and program code to selectively update the system prioritization at the application server based on a registration message received from the access terminal indicating the updated system prioritization, such that the system upon which the session initiation request is received corresponds to the highest-priority system in the updated system prioritization, wherein a determination to selectively update the system prioritization is automatically performed by the access terminal in response to a triggering event related to at least one of the plurality of systems, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal.

63. A non-transitory computer-readable storage medium, comprising instructions, which, when executed by an application server, cause the application server to perform operations, the instructions comprising:

program code to receive a session initiation request from an access terminal on a given system;

program code to receive a registration message indicating a system prioritization for a plurality of systems by which at least one target associated with the session initiation request can be contacted by the application server, each of the plurality of systems associated with a different physical-layer, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal;

program code to attempt to send an announce message announcing a communication session to the at least one target over a highest-priority system based on the system prioritization;

program code to, if the attempt is unsuccessful, re-send the announce message on at least one of the plurality of systems other than the highest-priority system; and program code to, if one of the attempts to send or re-send the announce message is successful, receive a supplemental registration message indicating an updated system prioritization at the application server such that the system upon which the successful attempt is made corresponds to the highest-priority system in the updated system prioritization, wherein a determination to selectively update the system prioritization is automatically performed by the access terminal in response to a triggering event related to at least one of the plurality of systems.

64. A non-transitory computer-readable storage medium, comprising instructions, which, when executed by an access terminal, cause the access terminal to perform operations, the instructions comprising:

program code to receive an announce message announcing a communication session on a given system;

program code to determine whether the given system upon which the announce message is received corresponds to a highest-priority system among a previously established system prioritization for a plurality of systems by which the access terminal can be contacted by an application server, each of the plurality of systems associated with a different physical-layer; and program code to selectively update the system prioritization with the application server by sending a registration message to indicate the updated system prioritization to the application server, such that the system upon which the announce message is received corresponds to the highest-priority system in the updated system prioritization, wherein a determination to selectively update the system prioritization is automatically performed by the access terminal in response to a triggering event related to at least one of the plurality of systems, wherein the registration message includes contact information that permits data sent over a system interface corresponding to one of the plurality of systems to be recognized by a corresponding system at a radio access network (RAN) and permits a corresponding system at the RAN to send data to the corresponding system interface at the access terminal.

* * * * *